(12) United States Patent
Katsumata et al.

(10) Patent No.: US 6,829,090 B2
(45) Date of Patent: Dec. 7, 2004

(54) PRISM, PROJECTION DEVICE AND OPTICAL COMPONENT

(75) Inventors: Masao Katsumata, Tokyo (JP); Hideki Yamamoto, Saitama (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 10/260,798

(22) Filed: Sep. 30, 2002

(65) Prior Publication Data

US 2003/0081317 A1 May 1, 2003

(30) Foreign Application Priority Data

Oct. 1, 2001 (JP) ........................................ 2001-305811

(51) Int. Cl.$^7$ ................................................ G02B 5/30
(52) U.S. Cl. ........................ 359/486; 359/566; 353/20; 349/9
(58) Field of Search ................................ 359/566, 495, 359/831, 485, 486, 496, 497, 569; 362/19; 353/20; 349/9

(56) References Cited

U.S. PATENT DOCUMENTS

| | | | | |
|---|---|---|---|---|
| 5,303,256 A | * | 4/1994 | Sumida | ...................... 372/106 |
| 5,488,592 A | * | 1/1996 | Kim | ........................ 369/13.29 |
| 6,179,423 B1 | * | 1/2001 | Kato et al. | .................... 353/31 |
| 6,288,840 B1 | * | 9/2001 | Perkins et al. | .............. 359/486 |
| 6,563,551 B1 | * | 5/2003 | Janssen et al. | .............. 348/759 |

* cited by examiner

*Primary Examiner*—Thong Nguyen
*Assistant Examiner*—Arnel C. Lavarias
(74) *Attorney, Agent, or Firm*—Frommer Lawrence & Haug LLP; William S. Frommer; Samuel S. Lee

(57) ABSTRACT

A prism optimally separating and synthesizing a light beam of a wide angle of incidence. A diffraction prism 15 of the present invention is so constructed that a diffraction grid 21 is sandwiched between a pair of diffraction grid substrates 22, a pair of prism substrates 24 are bonded to the surfaces of the prism substrates 22 facing the diffraction grid 21 with interposition of adhesive layers 23, and a diffraction grid medium 25 having a refractive index substantially equal to that of the prism substrates 24 is charged in a gap defined by the diffraction grid 21 and the prism substrates 24, with the respective component members being optically combined together. An incident light is led to the diffraction grid 21 and separated on transmission or reflection by the operation of diffraction by the diffraction grid 21.

22 Claims, 7 Drawing Sheets

PRISM, PROJECTION DEVICE AND OPTICAL COMPONENT

BACKGROUND OF THE INVENTION

1. Field of the Invention

This invention relates to a prism for separating the illuminated light from a light source depending on the wavelength or polarized light components, a projection device for modulating the illuminated light radiated from the light source using a reflection type optical modulating element and for projecting the light to an enlarged scale using a lens and an optical component used in this prism and in the projection device.

2. Description of Related Art

For enabling display on a large sized screen, there has so far been known a projection device in which illuminated light is radiated from a lamp to a liquid crystal panel, on which a pattern consistent with input picture signals is displayed, and in which the illuminated light is modulated and reflected by the liquid crystal panel so as to be projected to an enlarged scale using a projector lens.

In this projection device, a polarized beam splitter (PBS) for separating the forward and return optical paths is provided in the optical path so that the optical path for the illuminated light towards the liquid crystal panel and that for the reflected light modulated by the liquid crystal panel will not be the same optical path. In this PBS 200, a pair of corner prisms 202, as substrates, are bonded together to hold a dielectric multi-layer film 201 in-between as shown in FIG. 1. Moreover, in this PBS 200, the dielectric multi-layer film 201 is formed to have different reflectance and transmittance values, depending on the wavelength or the direction of light polarization, and operates as a beam splitter for separating a light beam depending on the wavelength or the direction of light polarization.

The PBS 200 can be classified into a McNeill type in which the dielectric multi-layer film 201 separates the light beam depending on the polarized light component, and a dichroic type, in which the light beam is separated depending on the wavelength.

In the McNeill or dichroic type PBS, exploiting the interference of multi-layer dielectric films, the performance is determined by the refractive index of the substrate and the combination of the layered dielectric materials, so that the performance beyond a certain limit cannot be achieved. In such PBS, it is extremely difficult to maintain separation characteristics between the P-polarized light and the S-polarized light over a wide angle of incidence. Thus, if this PBS is built into an optical system with a large angular distribution, that is with a small F-value, light separation characteristics as well as the light exploitation efficiently is lowered.

As a solution, a flat plate shaped diffraction grid PBS 210, shown in FIG. 2, may be used. In this diffraction grid PBS 210, a diffraction grid 212 of e.g., aluminum is provided on a glass substrate 211. By this diffraction grid 212, light is separated depending on polarized components. However, if the grid is used as a beam splitter, the diffraction grid PBS 210 needs to be arranged obliquely relative to the main light beam, so that, if the diffraction grid PBS is inserted into the optical path, astigmatic aberration is produced.

In the case of the McNeill or dichroic prism, distortion is produced in the prism due to temperature rise in the prism or by a holding mechanism, so that diffraction distribution in the substrate becomes nonuniform with the result that phase difference is produced in the light transmitted through the substrate and hence the extinction ratio is partially lowered. With the projection device, employing this prism, so-called black spots are produced in the projected image such that clear images cannot be projected.

Thus, as a prism substrate, such a material having a low modulus of opto-elasticity and less susceptible to distortion in the prism needs to be selected. However, a material having a low modulus of opto-elasticity is costly, such that the prism employing the low modulus of opto-elasticity or the projection device employing such prism is expensive. On the other hand, it is extremely difficult to produce a prism of high performance from an inexpensive vitreous material having a high modulus of opto-elasticity.

SUMMARY OF THE INVENTION

In view of the above-depicted status of the art, it is an object of the present invention to provide a prism or an optical component, in which astigmatic aberration is suppressed and which has uniform distribution of the modulus of elasticity in the substrate, and a projection device employing such prism or optical component.

In one aspect, the present invention provides a prism for transmitting or reflecting incident light depending on polarized light components thereof, including a substantially grid-shaped diffraction grid, formed of metal, a pair of diffraction grid substrates sandwiching the diffraction grid in-between, an adhesive layer provided on each surface of each diffraction grid substrate facing the diffraction grid, and a pair of block members secured through the adhesive layer to each of the paired diffraction grid substrates, wherein a medium having a refractive index approximately equivalent to that of the block members is charged in a gap defined between the diffraction grid and the paired grid substrates.

With the prism of the present invention, the diffraction grid is sandwiched between a pair of the block members to suppress the astigmatic aberration in the image-forming optical system. The incident light may be transmitted or reflected depending on the polarized light components as optimum polarized light separation characteristics are maintained over a wide angle of incidence.

In another aspect, the present invention provides a projector device including a light source for radiating illuminated light, a light collecting lens for collecting the illuminated light radiated from the light source, a prism for transmitting or reflecting the light from the light collecting lens depending on polarized light components thereof, a light modulating element for modulating the illuminated light transmitted or reflected by the prism and for reflecting the modulated light, and a projector lens for enlarging and projecting the reflected light reflected or transmitted by the prism and modulated by the light modulating element, wherein the prism includes a substantially grid-shaped diffraction grid, formed of metal, a pair of diffraction grid substrates sandwiching the diffraction grid in-between, an adhesive layer provided on each surface of each diffraction grid substrate facing the diffraction grid, a pair of block members secured through the adhesive layer to each of the paired diffraction grid substrates, and a medium having a refractive index approximately equivalent to that of the block members, the medium being charged in a gap defined between the diffraction grid and the paired grid substrates.

With the projection device of the present invention, when the reflected light modulated by the optical modulation element is transmitted through or reflected by the prism, the image of the reflected light may be projected as reflected light is optimally separated into polarized light components and as astigmatic aberration is prevented from occurring.

In still another aspect, the present invention provides an optical component in which the light of preset polarization state is transmitted and radiated, wherein plural plate shaped members, having the surfaces polished to mirror finish, are layered together with interposition of soft type adhesives.

With this optical component of the present invention, in which the plural plate shaped members are layered together with interposition of soft type adhesives, the internal stress produced by strain may be suppressed to maintain the refractive index distribution constant to permit light to be transmitted without disturbing the state of polarization.

In another aspect, the present invention provides a prism including a light separating layer provided on a plate-shaped substrate and having the properties of transmitting or reflecting light depending on polarized light components, a pair of adhesive layers on both surfaces of the plate-shaped substrate provided with the light separating layer, and a pair of block members sandwiching the light separating layer with the adhesive layer in-between, each block member being a plurality of plate shaped members having surfaces polished to a mirror finish, the plate shaped members being alternately layered with soft type adhesive in-between.

With the present prism, in which the light separating layer is sandwiched with block members comprised of plural plate shaped members layered together with interposition of soft type adhesive layers, the incident light may be transmitted or reflected depending on the polarized light components and radiated without disturbing the state of polarization under suppression of astigmatic aberration.

In yet another aspect, the present invention provides a projector device including a light source for radiating illuminated light, a light collecting lens for collecting the illuminated light radiated from the light source, a prism for transmitting or reflecting the light from the light collecting lens depending on polarized light components thereof, a light modulating element for modulating the illuminated light transmitted or reflected by the prism and for reflecting the modulated light, and a projector lens for enlarging and projecting the reflected light reflected or transmitted by the prism and modulated by the light modulating element, wherein the prism comprises a light separating layer provided on a plate-shaped substrate and having the properties of transmitting or reflecting light depending on polarized light components, a pair of adhesive layers on both surfaces of the plate-shaped substrate provided with the light separating layer, and a pair of block members sandwiching the light separating layer with the adhesive layer in-between, each block member being a plurality of plate shaped members having surfaces polished to a mirror finish, the plate shaped members being alternately layered with soft type adhesive in-between.

With the projection device of the present invention, when the light modulated by the optical modulating element is modulated and reflected, the reflected light may be optimally separated into respective polarized light components, while the image is projected by the projector lens under suppression of astigmatic aberration.

With the present prism, a light beam may be optimally separated over a wide angle of incidence, while the astigmatic aberration may be suppressed even if the prism is used in the image-forming optical system. Since desired characteristics of the prism may be achieved without using the substrate of a high refractive index, by reason of the superior separation characteristics, it is possible to realize a favorable performance at the same cost as compared with the PBS by the dielectric multilayer film. Since it is unnecessary to use a substrate of a high refractive index, it is possible to reduce the cost and the weight. The present prism may be used in a variety of optical systems in view of the high degree of freedom in combining different materials of the constituent elements which lead to desired characteristics.

Since the soft type adhesive is provided between the grid substrate and the prism substrates, it is possible to suppress the internal stress and optical distortion. Additionally, since the prism substrates are comprised of flat plate shaped members optically combined with interposition of a soft type adhesives, it is possible to further reduce internal stress and optical distortion.

With the projector device, employing the present prism, separation characteristics may be maintained at a high NA and hence a bright image of high contrast may be produced, while the light utilization efficiency may be improved. Since the astigmatic aberration in the image-forming optical system may be suppressed with use of the present prism, a bright image may be projected. Moreover, with the use of the present prism, the cost and the overall weight of the device may be reduced.

Since the prism allows to reduce optical distortion, it is possible to suppress black spots in the projected image and distortion otherwise caused by the thermal stress and to reduce the effect of heat otherwise produced by increasing the volume of light incident on the prism, with the consequence that the volume of light radiated from the light source may be increased to increase the brightness of the projected image.

The present optical component may be divided into plural plate-shaped members and soft type adhesive layers may be interposed in the interface region. Thus, the stress applied to the interface region may be relieved by the soft type adhesive layers to suppress possible optical distortion.

DESCRIPTION OF THE PREFERRED EMBODIMENTS

Figure 1:
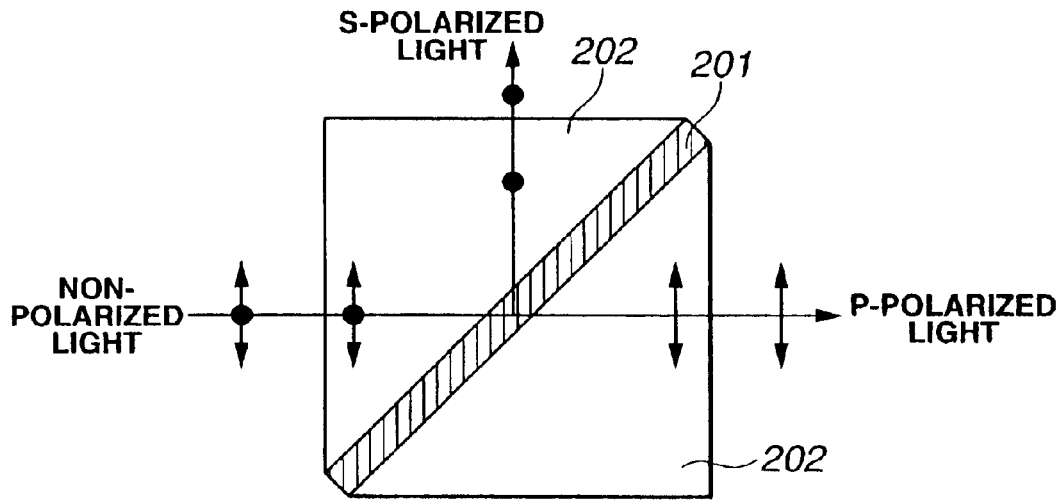
FIG. 1 shows a structure of a conventional PBS.
Figure 2:
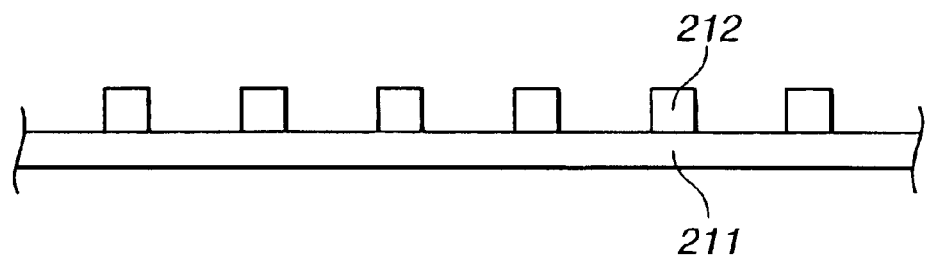
FIG. 2 shows a structure of a conventional diffraction grid PBS.

Referring to the drawings, preferred embodiments of a projector device according to the present invention is now explained in detail.

Figure 3:
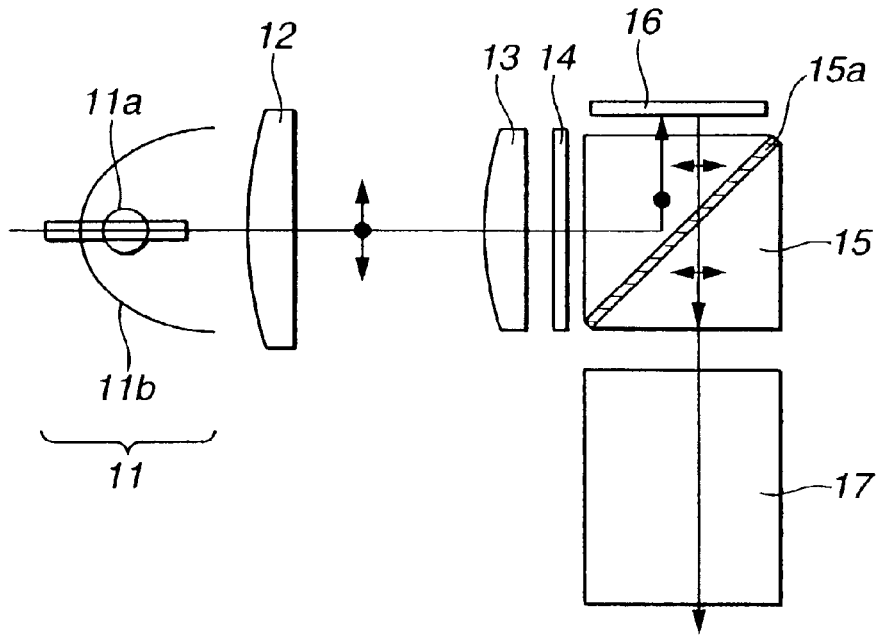
FIG. 3 shows a structure of a projector device embodying the present invention.

The projector device 10, embodying the present invention, shown in FIG. 3, includes a lamp 11, as a light source for radiating illuminated light and, looking from the lamp sequentially along the optical path, a main condenser 12, a field lens 13, a pre-polarizing plate 14, a diffraction prism 15, a reflection type liquid crystal panel 16 and a projection lens 17.

The lamp 11 includes a light emitting element 11a, emitting white light, and a reflector 11b for reflecting the light emitted by the light emitting element 11a. As the light emitting element 11a of the lamp 11, a high-pressure mercury lamp, a halogen lamp, a metal halide lamp or a xenon lamp, is used. As the reflector 11b of the lamp 11, a concave mirror is used. Such a mirror is preferred which has a mirror surface of high perimetrical efficiency. For example, the reflector is of a symmetrical rotation, such as a paraboloid revolution or a spheroidal revolution.

The main condenser 12 is made up by a convex lens for condensing the illuminated light radiated from the lamp 11.

The field lens 13 is formed by a convex lens which is arranged so that the illuminated light transmitted through the main condenser 12 is condensed and so that the light beam by the illuminated light is modulated by a reflection type liquid crystal panel 16 and output through the projection lens 17.

The pre-polarizing plate 14 is a polarizing plate adapted for transmitting only a preset polarized component of the illuminated light transmitted through field lens 13, such as S-polarized component.

The diffraction prism 15 is adapted for transmitting or reflecting the illuminated light, transmitted through the pre-polarizing plate 14, for separation, depending on the polarized light component transmitted through the pre-polarizing plate 14. For example, the diffraction prism 15 transmits the P-polarized light, while reflecting the S-polarized light on a reflection plane 15a which is inclined 45° relative to the optical path to deflect the light proceeding direction by 90°.

In the diffraction prism 15, the light transmitted through the pre-polarizing plate 14 is separated into light transmitted through the diffraction prism 15 and proceeding straightforward and into light reflected on a reflecting surface 15a and deflected 90° in its proceeding direction.

The projector device 10 includes the reflection type liquid crystal panel 16 along the proceeding direction of the illuminated light reflected on the reflecting surface 15a of the diffraction prism 15.

The reflection type liquid crystal panel 16 is fed with picture signals to display a pattern corresponding to the picture signals. Thus, when supplied with the illuminated light, as incident light, the reflection type liquid crystal panel 16 modulates and reflects this illuminated light. This reflection type liquid crystal panel 16 is a liquid crystal panel, having sealed therein liquid crystal molecules, and which is able to modulate light from pixel to pixel.

With the diffraction prism 15, the reflected light, modulated by the reflection type liquid crystal panel 16, is transmitted through the reflecting surface 15a to proceed straightforward.

The projector device 10 also includes a projection lens 17 along the proceeding direction of the reflected light transmitted through the reflecting surface 15a of the diffraction prism 15 and modulated by the reflection type liquid crystal panel 16.

The projection lens 17 is a lens adapted for projecting the reflected light transmitted through the reflecting surface 15a of the diffraction prism 15 and which is modulated by the reflection type liquid crystal panel 16, to an enlarged scale. The projection lens 17 is adapted for projecting an image on a screen, not shown.

The structure of the diffraction prism 15 is hereinafter explained.

Figure 4:
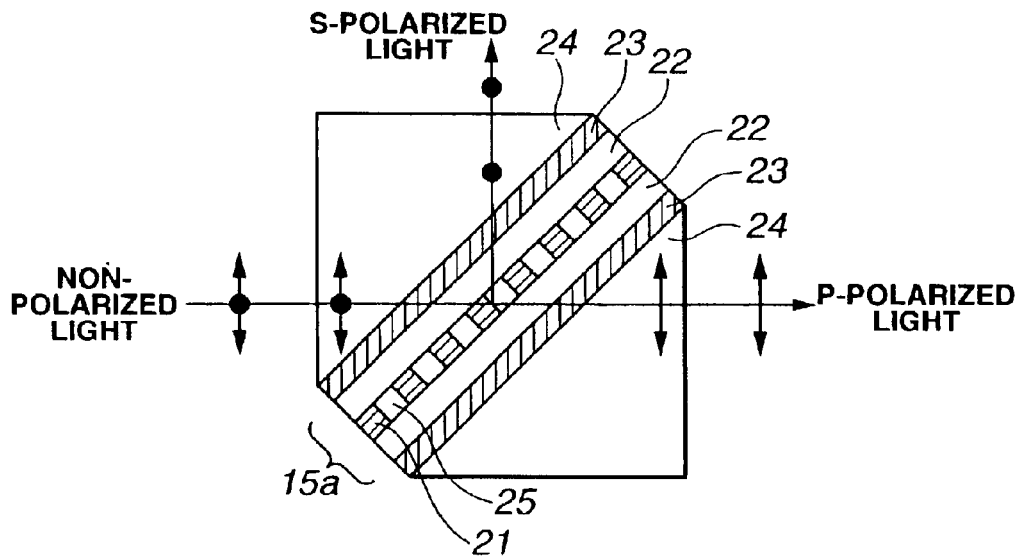
FIG. 4 shows a structure of a prism embodying the present invention.

Referring to FIG. 4, the diffraction prism 15 includes a diffraction grid 21, adapted for diffracting the incident light, a pair of diffraction grid substrates 22, arranged on both sides of the diffraction grid 21, and a pair of prism substrates 24, bonded to the surfaces of the diffraction grid substrates 22 facing the diffraction grid 21 via adhesive layers 23.

The diffraction grid 21 is formed of metal, such as aluminum, substantially as a grid between the paired diffraction grid substrates 22. The material for the diffraction grid 21 is not necessarily aluminum and may also be other materials depending on the type of the optical system.

The diffraction grid substrates 22 are formed by thin flat plates of e.g., glass, and are placed on both sides of the diffraction grid 21.

The adhesive layer 23 is a soft type adhesive and may, for example, be a UV adhesive exhibiting rubber-like performance or a silicon adhesive exhibiting rubber-like performance. The adhesive layers 23 are provided on the surfaces of the diffraction grid substrates 22 facing the diffraction grid 21 of the diffraction grid substrates 22.

The prism substrates 24 are formed of vitreous materials, such as quartz exhibiting only low birefringence or a vitreous material such as SF57 manufactured by Shot Inc. Each prism substrate 24 is a so-called corner prism having a substantially square pillar shape. In this embodiment, the prism substrate 24 is formed by a pillar having a bottom of a substantially rectangular triangular shape, with two sides of the triangle running substantially at right angles to each other, each paired diffraction grid substrate 22 being arranged at an inclined position along a lateral surface of each block member having one side of said triangle other than said two sides as an edge.

In a gap between the diffraction grid 21 and the diffraction grid substrates 22 is charged a diffraction grid medium 25 for optically connecting (coupling) the diffraction grid 21 and the diffraction grid substrates 22. If the diffraction grid medium 25 is not charged in the gap between the diffraction grid 21 and the diffraction grid substrates 22, this gap proves an air gap such that reflection occurs due to the difference in the refractive index on an interface between air and the diffraction grid substrates 22 to degrade the separation characteristics significantly.

The diffraction grid substrates 22 and the diffraction grid medium 25 are designed and manufactured with the refractive index approximately equal to that of the prism substrates 24. The interface between the prism substrates 24 and the diffraction grid substrates 22 represents an optically bonded (coupled) area with the aid of the adhesive layers 23. That is, the optically bonded diffraction grid 21 is manufactured, arranging the pitch and the height of the diffraction grid 21 formed of metal to meet the characteristics of the diffraction grid medium 25 and the diffraction grid substrates 22, so as to get the predetermined polarized light separation characteristics.

In this diffraction prism 15, when non-polarized light is incident thereon, the light reaches the diffraction grid 21 without undergoing internal reflection, because the respective interfaces are optically bonded, as described above. Under the influence of diffraction by this diffraction prism 15, the S-polarized light is reflected on the reflecting surface 15a, while the P-polarized light is transmitted through the reflecting surface 15a, whereby the P-polarized light S-polarized light may be optimally separated from each other.

Since the diffraction prism 15 is formed by the diffraction grid 21 and the diffraction grid substrates 22 and is arranged so that the diffraction grid PBS having optimum separation characteristics at a wide angle of incidence is sandwiched through the adhesive layers 23 by the prism substrates 24, excellent separation characteristics may be achieved over a wide angle of incidence, while astigmatic aberration may be prohibited even if the diffraction prism 15 is used in the image-forming optical system.

In the diffraction prism 15, because of the high flexibility for selecting and combining the materials of the respective component such as the diffraction grid substrates 22, diffraction grid medium 25 or the prism substrates 24, the diffraction prism 15 may be used for a variety of optical systems readily to achieve desired properties.

Moreover, since the separation characteristics of the diffraction prism 15 are superior over a wide angle of incidence, desired characteristics may be obtained using a high quality vitreous material, that is a substrate having not so high refractive index, so that, in comparison with a PBS by the dielectric multi-layer film, the equivalent performance may be achieved at the same cost. In addition, since the vitreous material with a high refractive index has a high specific gravity, the diffraction prism 15 may be reduced in weight by lowering the refractive index even only slightly.

Additionally, since the soft type adhesive layers 23 are provided between the diffraction grid substrates 22 and the prism substrates 24, it is possible to lower the stress generated in the diffraction prism 15 to reduce the optical distortion.

The operation of various components of the projector device 10, described above, is now explained, mainly in connection with the path of the illuminated light radiated from the lamp 11.

The illuminated light, radiated from the lamp 11, falls on the main condenser 12 as non-polarized light.

The illuminated light, incident on the main condenser 12, is condensed thereby and routed to the field lens 13 where it is collected and led to the pre-polarizing plate 14.

The illuminated light, led to the pre-polarizing plate 14, only has e.g., the component of the S-polarized light transmitted and led to the diffraction prism 15.

The illuminated light, led to the pre-polarizing plate 14, is the S-polarized light, such that the unneeded P-polarized light is transmitted through the reflecting surface 15a to proceed straightforward, while the S-polarized light is reflected by the reflecting surface 15a and has its proceeding direction changed by 90°. That is, the illuminated light is reflected by the reflecting surface 15a of the diffraction prism 15 to fall on the reflection type liquid crystal panel 16.

The illuminated light, led to the reflection type liquid crystal panel 16, is the S-polarized light, and is modulated and reflected by the reflection type liquid crystal panel 16, on which is displayed a pattern corresponding to picture signals, and is thereby changed in its proceeding direction by 180°. At this time, the P-polarized light is generated and returned to the diffraction prism 15.

The reflected light from the reflection type liquid crystal panel 16, returned to the diffraction prism 15, is made up by the P-polarized light and the S-polarized light, which is the unneeded OFF light. The P-polarized light is transmitted through the reflecting surface 15a of the diffraction prism 15 and led to the projection lens 17, while the S-polarized light is reflected by the reflecting surface 15a and is returned to the lamp 11, as it is thereby changed in its proceeding direction by 90°.

The illuminated light, radiated from the lamp 11, is led by the diffraction prism to the reflection type liquid crystal panel 16, by which it is modulated and reflected. The light modulated and reflected by the reflection type liquid crystal panel 16 is led the projection lens 17 by which it is projected to an enlarged scale on e.g., a screen.

With the projector device 10, described above, employing the diffraction prism having the diffraction grid 21, the light incidence angle dependency of the polarized light separation characteristics may be reduced to allow to maintain separation characteristics at a high NA. In addition, an image with good contrast may be projected, while the light utilization efficiency may be improved to allow to project a bright image.

Moreover, with the projector device 10, employing the diffraction prism 15, it is possible to suppress the astigmatic aberration which might be produced in the image-forming optical system if only the conventional flat plate shaped diffraction grid PBS is used, thus allowing to project a bright image.

With the projector device 10, in which the lightweight diffraction prism 15 can be prepared at a low cost, it is possible to reduce the cost and the weight of the overall device.

With the projector device 10, in which the diffraction prism 15 is able to reduce the optical distortion, it is possible to suppress black spots in the projected image.

Figure 5:
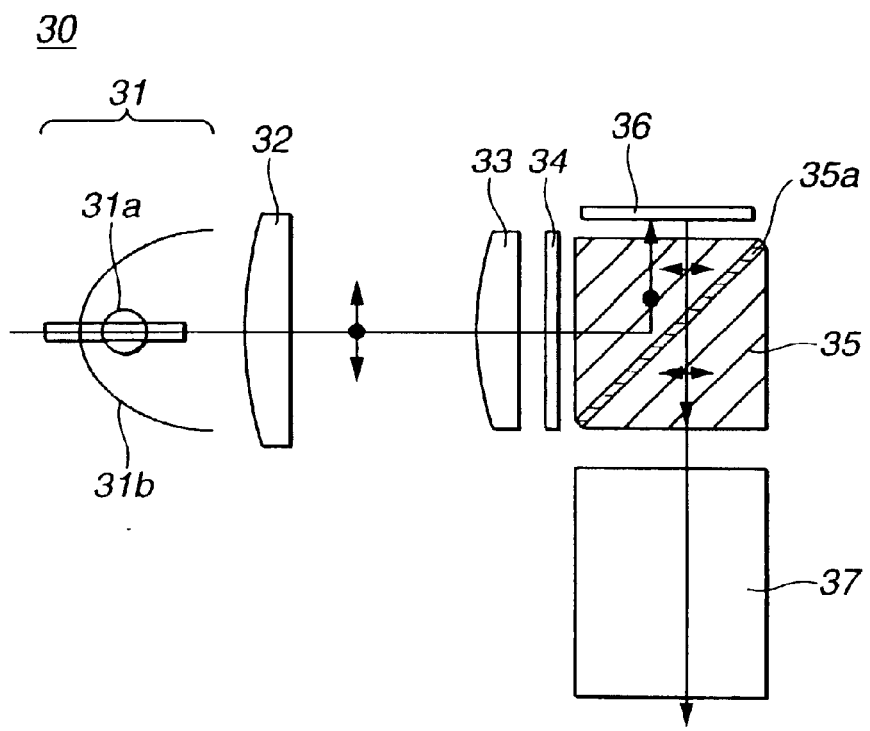
FIG. 5 shows another structure of a projector device embodying the present invention.

As another projector device, employing the present invention, a projector device 30, shown in FIG. 5, is hereinafter explained.

The projector device 30 includes a lamp 31, as a light source radiating the illuminated light. Additionally, the projector device 30 includes a main condenser 32, a field lens 33, a pre-polarizing plate 34 and a diffraction prism 35, looking from the lamp 31 along the forward direction of the optical path.

The lamp 31 is adapted for generating white light. This lamp 31 includes a light emitting element 31a, generating the white light, and a reflector 31b, for reflecting the light emitted by the light emitting element 31a. As the light emitting element 31a, a high pressure mercury lamp, a halogen lamp, a metal halide lamp, or a xenon lamp, for example, is used. Preferably, a concave mirror having a mirror surface of such a shape as to give high peripheral efficiency is used as the reflector 31b of the lamp 31. For example, the reflector is of a symmetrical rotation, such as a paraboloid revolution or a spheroidal revolution.

The main condenser 32 is made up by a convex lens for condensing the illuminated light radiated from the lamp 31.

The field lens 13 is formed by a convex lens for collecting the illuminated light transmitted through the main condenser 32.

The pre-polarizing plate 34 is a polarizing element allowing to transmit only preset polarized component, e.g., S-polarized light, in the illuminated light transmitted through the field lens 33. The polarizing element used may be a PBS.

The diffraction prism 35 is adapted for separating the illuminated light transmitted through the pre-polarizing plate 34, by transmission or reflection, depending on its polarized components. The diffraction prism 35 is adapted for transmitting e.g., the P-polarized light and for reflecting the S-polarized light, by its reflecting surface 35a, inclined 45° relative to the optical path, for deviating its proceeding direction by 90°.

The diffraction prism 35 separates the illuminated light, transmitted through the pre-polarizing plate 34, into light transmitted through the diffraction prism 35 so as to proceed straightforward, and into light reflected by the reflecting surface 35a so as to be thereby deflected in its proceeding direction by 90°.

The projector device 30 also includes a reflection type liquid crystal panel 36 along the proceeding direction of the illuminated light reflected by the reflecting surface 35a of the diffraction prism 35.

The reflection type liquid crystal panel 36, supplied with picture signals to display a pattern corresponding to the picture signals, modulates the illuminated light, incident thereon, to reflect the modulated light. This reflection type liquid crystal panel 36 is a liquid crystal panel, having liquid crystal molecules, sealed therein, and is adapted for modulating the light from one pixel to another.

In the diffraction prism 35, the reflected light, modulated by the reflection type liquid crystal panel 36, is transmitted through the reflecting surface 35a to proceed straightforward.

The projector device 30 includes a projection lens 37 in the proceeding direction of the reflected light, which is transmitted through the reflecting surface 35a of the diffraction prism 35 and modulated by the reflection type liquid crystal panel 36.

The projection lens 37 is a convex lens for enlarging and projecting the reflected light transmitted through the reflecting surface 35a of the diffraction prism 35 and modulated by the reflection type liquid crystal panel 36, and is adapted for projecting an image on a screen, not shown.

The above-mentioned optical components, inclusive of the diffraction prism 35, is subjected to optical distortion due to stress produced under the effect of heating by light from the light source, a holding force or the adhesive power produced in securing or bonding to the device.

Figure 6:
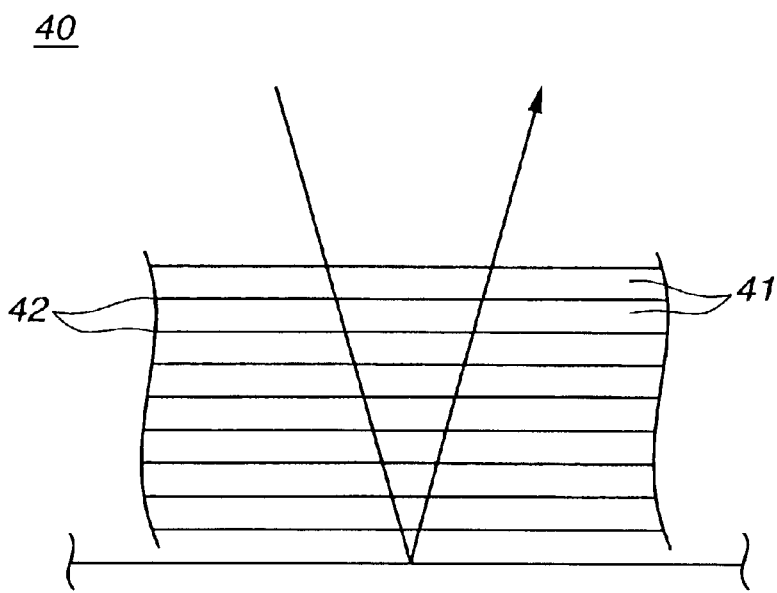
FIG. 6 shows a structure of an optical component embodying the present invention.

This problem may be overcome by splitting an optical component 40 into plural flat plate members 41 and by layering these plate members 41 using a soft adhesive layer 42 as shown in FIG. 6.

That is, the optical component 40 includes the plural flat plate members 41 and the soft type adhesive layer 42 for bonding these plate members together. The flat plate members 41 are surface-ground on their surfaces and are formed of a material similar to that of the optical component 40. The adhesive layer 42 may for example be a rubber-like UV adhesive or a rubber-like silicon adhesive.

With the above-described optical component 40, the flat plate members 41 and the adhesive layer 42 are optically bonded together in boundary area thereof and hence act as a sole component.

The optical component 40 also has its component members split into plural flat plate members 41, and the soft type adhesive layer 42 into interface regions thereof to dissipate the stress applied to the interface regions by the adhesive layer 42 to suppress optical distortion. That is, the entire optical component 40 can be lowered in its opto-elastic constant. Stated differently, the optical component 40 low in opto-elastic constant may be prepared by splitting the member with a high opto-elastic constant into plural flat plate members 41, as described above.

Thus, by splitting an optical member into plural flat plate members for releasing the stress of the preset optical member and by bonding the interface regions of the flat plates, the stress applied to the interface regions may be released by the adhesive to suppress optical distortion. Consequently, even if the incident light in its optical path through the optical member is separated by e.g., polarized light separating layers into e.g., the S-polarized light or the P-polarized light, the light can be transmitted and radiated without the direction of the polarized light being disturbed due to optical distortions.

Moreover, if an optical member in the form of a triangular or square prism is split into plural flat plate members, having gradually changing cross-sectional shape, and these flat plate members are layered together using the soft type adhesive layer, that is if the shapes of the two surfaces, layered together with interposition of the soft type adhesive, are different, and the layering surface is equal in shape to the layering surface of the other neighboring flat plate member, the stress due to temperature changes in the respective flat plate members of different sizes can be absorbed with advantage by the soft type adhesive.

In the present projector device 30, this technique is used in the diffraction prism 35.

The structure of the diffraction prism 35 is now explained.

Figure 7:
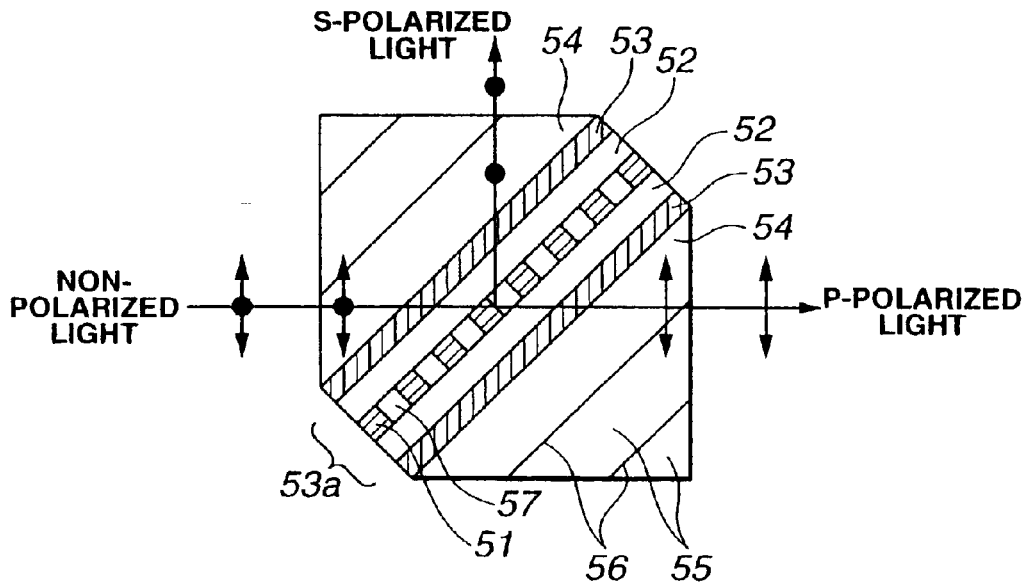
FIG. 7 shows a structure of a prism embodying the present invention, with a corner prism having a layered structure.

Referring to FIG. 7, the diffraction prism 35 includes a diffraction grid 51, a pair of diffraction grid substrates 52, for sandwiching the diffraction grid 51 in-between, and a pair of prism substrates 54, bonded with adhesive layers 53 to the surfaces of the diffraction grid substrates 52 facing the diffraction grid 51.

The diffraction grid 51 is formed of metal, such as aluminum, to substantially the shape of a grid between the paired diffraction grid substrates 52. The metal material forming the diffraction grid 51 may be other than aluminum depending on the type of the optical system used.

The diffraction grid substrates 52 are each a thin flat plate of e.g., glass and are adapted for sandwiching the diffraction grid 51 in-between.

The adhesive layer 53 is a soft type adhesive, such as rubber-like UV adhesive or rubber-like silicon adhesive. The adhesive 53 is provided on each of the surfaces of the diffraction grid substrates 52 facing the diffraction grid 51.

The prism substrates 54 are each a so-called corner prism in the form of substantially a square pyramid.

Each prism substrate 54 is made up by plural flat plate members 55, each polished to a mirror surface. The plural flat plate members 55 are optically combined together using a soft type adhesive 56.

The soft type adhesive 56 is formed by a soft type adhesive, such as rubber-like UV adhesive or a rubber-like silicon adhesive.

In the present embodiment, each triangular prism substrate 54 is split into plural flat plate members of a square-shaped flat plate members 55. At least one flat plate member 55 has its two layered surfaces of different shapes, bonded together via a soft adhesive layer 56, with the layered surface being of the same shape as the layered surface of the adjacent flat plate member 55. These flat plate members 55 of different shapes are layered together to form each prism substrate 54 which in its entirety has the shape of the triangular prism substrate 54. Each prism substrate 54 operates as a sole prism, in which the boundary surfaces between the flat plate member 55 and the soft adhesive layer 56 are bonded optically to one another.

With the plural flat plate member 55, making up the prism substrate 54, the adhesive layer 53 of the diffraction grid substrates 52 and the soft adhesive layer 56 are arranged parallel to each other, so that the diffraction grid substrates 52 and the flat plate members 55 can be optimally combined together through the adhesive layers 53 with the respective surfaces of the diffraction grid substrates 52 and the flat plate members 55 facing each other.

In a gap between the diffraction grid 51 and the diffraction grid substrates 52 is charged a diffraction grid medium 57. If the diffraction grid medium 57 is not charged in the gap between the diffraction grid 51 and the diffraction grid substrates 52, this gap operates as an air gap such that reflection due to the differential refractive index occurs on the interface between the diffraction grid 51 and the diffraction grid substrates 52 to deteriorate separation characteristics significantly.

It is noted that the diffraction grid substrates 52 and the diffraction grid medium 57 are designed and constructed so as to have substantially the same refractive index as that of the prism substrates 54, while the prism substrates 54 and the diffraction grid substrates 52 are optically combined together at the interface region thereof with the aid of the adhesive layers 53.

With the diffraction prism 35, in which the entire interfaces are optically combined together as described above, the non-polarized light incident thereon reaches the diffraction grid 51, without undergoing internal reflection, so that the S-polarized light is reflected on the reflecting surface 53a under the effect of diffraction by the diffraction grid 51, while the P-polarized light is transmitted through the reflecting surface 53a. This separates the non-polarized light into the P-polarized light and the S-polarized light.

Thus, the diffraction prism 35 is made up by the diffraction grid 51 and the diffraction grid substrates 52, and the diffraction grid PBS, having superior separation characteristics over a wide angle of incidence, is sandwiched by the prism substrates 54 through the adhesive layers 53. Thus, the diffraction prism 35 is superior in separation characteristics over a wide angle of incidence, and is able to suppress astigmatic aberration even if the prism is used in an image-forming optical system.

Moreover, in the diffraction prism 35, having superior separation characteristics over a wide angle of incidence, desired characteristics may be achieved even with the use of a substrate formed of a high grade vitreous material, that is a substrate having a not so high refractive index, with the consequence that, as compared to the PBS by the dielectric multi-layer film, a comparable performance may be achieved at a lower cost. Additionally, since the vitreous material having a high refractive index generally is of a large specific gravity, the diffraction prism 35 may be reduced in weight by employing a vitreous material of a lower specific gravity.

In addition, since desired characteristics may readily be achieved with the diffraction prism 35 because of the high degree of combination freedom of the materials of the respective components and hence the diffraction prism 35 can be readily used in the various optical systems.

Moreover, in the diffraction prism 35, since the soft adhesive layers 53 are provided between the diffraction grid substrates 52 and the prism substrates 54, it is possible to decrease the stress generated in the diffraction prism 35, thus allowing to reduce the optical distortion.

In the diffraction prism 35, in which the prism substrates 54 are provided between plural plate-shaped members 55, it is possible to reduce the stress produced in the diffraction prism 35 further, thereby reducing optical distortion.

The operation of various components of the projector device 30, described above, is now explained, mainly along the path of the illuminated light radiated from the lamp 31.

The illuminated light, radiated from the lamp 31, falls on the main condenser 32 as non-polarized light.

The illuminated light, incident on the main condenser 32, is condensed thereby and routed to the field lens 33 where it is collected and led to the pre-polarizing plate 34.

The illuminated light, led to the pre-polarizing plate 34, only has e.g., the component of the S-polarized light transmitted and led to the diffraction prism 35.

The illuminated light, led to the diffraction prism 35, is the S-polarized light, such that the unneeded P-polarized light is transmitted through the reflecting surface 35a to proceed straightforward, while the S-polarized light is reflected by the reflecting surface 35a and has its proceeding direction changed by 90°. That is, the illuminated light is reflected by the reflecting surface 35a of the diffraction prism 35 to fall on the reflection type liquid crystal panel 36.

The illuminated light, led to the reflection type liquid crystal panel 36, is the S-polarized light, and is modulated and reflected by the reflection type liquid crystal panel 36, on which is displayed a pattern corresponding to picture signals, and is thereby changed in its proceeding direction by 180°. At this time, the P-polarized light is generated and returned to the diffraction prism 35.

The reflected light from the reflection type liquid crystal panel 36, returned to the diffraction prism 35, is made up by the P-polarized light and the S-polarized light, which is the unneeded OFF light. The P-polarized light is transmitted through the reflecting surface 35a of the diffraction prism 35, and led to the projector lens 17, while the S-polarized light is reflected by the reflecting surface 35a and returned to the lamp 61, as it is changed in its proceeding direction by 90°.

Thus, the illuminated light, radiated from the lamp 31, is led by the diffraction prism 35 towards the reflection type liquid crystal panel 36 so as to be thereby reflected and modulated. The reflected light, modulated by the reflection type liquid crystal panel 36, is led to the projection lens 37 so as to be thereby displayed on e.g., a screen to an enlarged scale.

With the above-described projector device 30, employing the diffraction prism 35, having the diffraction grid 51, separation characteristics at a high NA can be kept, and hence an image of a high contrast can be projected, while the light utilization efficiency may be improved to allow to project a bright image.

Moreover, with the above-described projector device 30, employing the diffraction prism 35, the astigmatic aberration, generated in the image-forming optical system with the use solely of the conventional flat plate shaped diffraction grid PBS, can be suppressed to allow to project a clear image.

With the projector device 30, in which the diffraction prism 35 can be produced at a lower cost, the overall cost of the device can be lowered.

With the projector device 30, in which the diffraction prism 35 is able to reduce the optical distortion, it is possible to suppress black spots in the projected image.

With the projector device 30, in which the diffraction prism 35 can be reduced in weight, the overall weight of the device can be reduced.

With the projector device 30, in which the diffraction prism 35 is able to suppress distortion, otherwise caused by thermal stresses, and hence the effect of heat generated by increasing the volume of the input light, the projected image can be improved in brightness.

Figure 8:
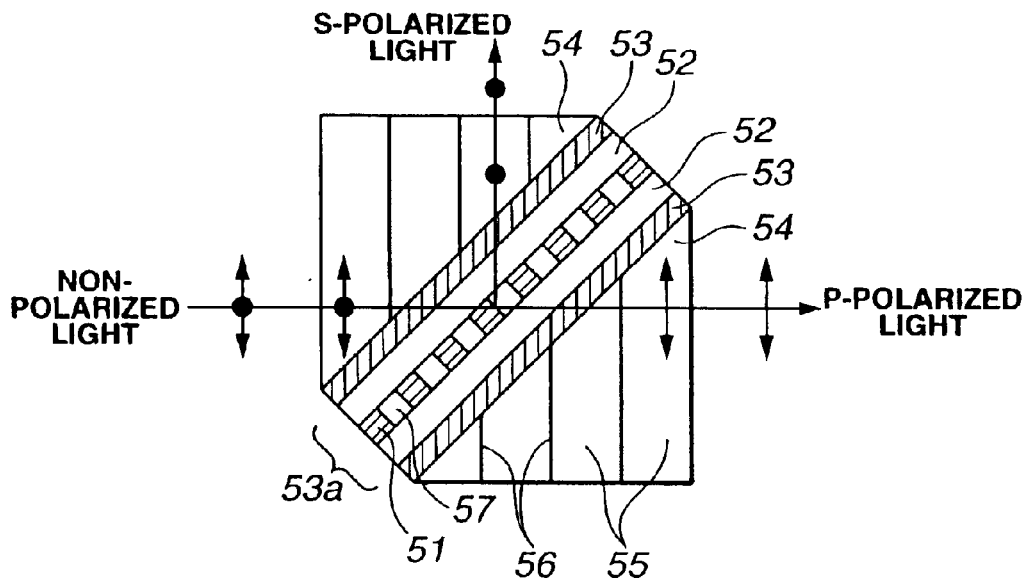
FIG. 8 shows another structure of a prism embodying the present invention, with a corner prism having a layered structure.

Meanwhile, in the above-described diffraction prism 35, the layering direction of the flat plate members 55 of the prism substrates 54 may be set as shown in FIG. 8. However, the layering direction of the flat plate members 55 is not limited to that shown in FIG. 7 or 8 such that it may be optimized for a particular optical system which may be in use.

The present invention may also be applied to a projector device employing plural diffraction prism 15 and/or diffraction prism 35 for projecting the color image.

Figure 9:
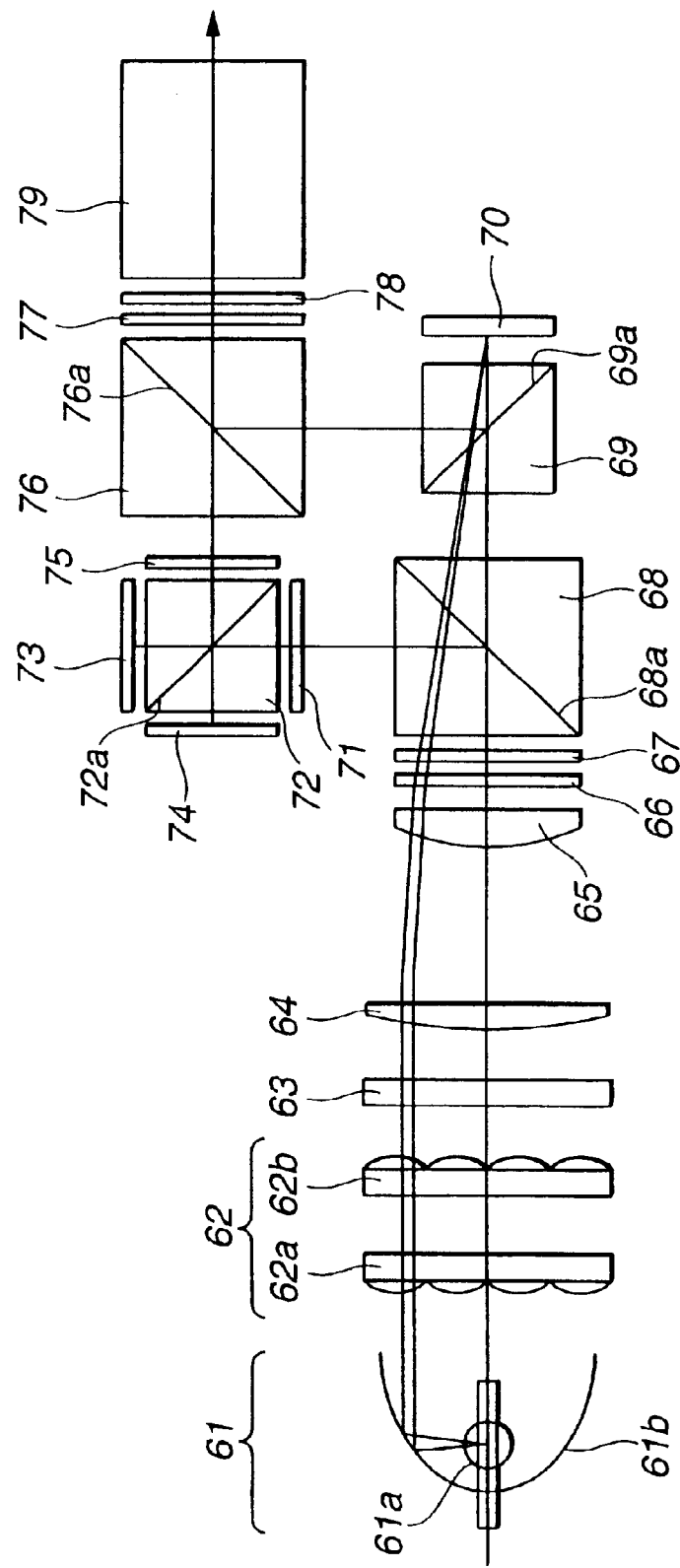
FIG. 9 shows still another structure of a projector device embodying the present invention.

First, a projector device 60, shown in FIG. 9, capable of projecting a color image according to the present invention, is hereinafter explained.

The projector device 60 includes a lamp 61, as a light source radiating the illuminated light. Additionally, the projector device 60 includes a fly-eye integrator 62, a PS conversion synthesis element 63, a main condenser 64, a field lens 65, a pre-polarization plate 66, a first G polarization rotating element 67 and an incident PBS 68, looking from the lamp 61 along the forward direction of the optical path.

The lamp 61 is adapted for radiating white light containing the light of wavelength bands for three prime colors of light, namely red, green and blue, as required for displaying a color image. This lamp 61 includes a light emitting element 61a, generating white light, and a reflector 61b for reflecting the light emitted by the light emitting element 61a. The light emitting element 61a includes a high-pressure mercury lamp, a halogen lamp, a metal halide lamp or a xenon lamp, is used. As the reflector 61b of the lamp 61, a concave mirror is used. Such a mirror is preferred which has a mirror surface of high perimetrical efficiency. For example, the reflector is of the type of a symmetrical rotation, such as a paraboloid revolution or a spheroidal revolution.

In order for the illuminated light, radiated from the lamp 61, to illuminate an effective area of the liquid crystal panel, as later explained, the fly-eye integrator 62 is designed and constructed so that the illuminated light is the light beam shaped to conform to the shape of the effective area of the liquid crystal panel to provide for uniform illuminance distribution. This fly-eye integrator 62, also termed a multi-lens array, is comprised of two sets each comprised of an array of plural small-sized convex lenses. One of the arrays 62a towards the lamp 61 collects the illuminated light from the lamp 61 to form small light source spots, while the other array 62b combines the illuminated light from the respective light source spots.

For effective utilization of the illuminated light from the lamp 61, the PS conversion synthesis element 63 is adapted for putting the polarized light components of the illuminated light into order. The PS conversion synthesis element 63 is formed by a λ/2 plate or a polarized beam splitter and is adapted for converting e.g., the P-polarized light into S-polarized light. Specifically, the PS conversion synthesis element 63 is able to transmit the S-polarized light of the incident illuminated light, while converting the P-polarized light into the S-polarized light, which is issued as output, so that the illuminated light in its entirety may be converted into S-polarized light.

The main condenser 64 is a convex lens for collecting the illuminated light transmitted through the PS conversion synthesis element 63.

The field lens 65 is a convex lens for collecting the illuminated light transmitting through the main condenser 64.

The pre-polarization plate 66 transmits only a preset polarized light component transmitted through the field lens 65. Specifically, the pre-polarization plate is adapted for transmitting the S-polarized light.

The first G polarization rotating element 67 is a layered type phase difference film optimized for rotating the polarization plane of a green wavelength band of the illuminated light collected by the field lens 65, that is the green light component, by 90°, and transmitting the so rotated light, while transmitting other wavelength bands, that is the red and blue components, without changing the polarization state of these light components.

The incident PBS 68 is adapted for separating the respective polarized light components of the illuminated light transmitted through the first G polarization rotating element 67 by transmission or reflection of the polarized light components. The incident PBS 68 is configured substantially equivalently to the aforementioned diffraction prism 15 or 35 and is adapted for transmitting e.g., the P-polarized light while reflecting the S-polarized light by a reflecting surface 68a inclined 45° relative to the optical path to deflect its proceeding direction by 90°.

The incident PBS 68 separates the illuminated light transmitting through the first G polarization rotating element 67 into light transmitted through the incident PBS 68 to proceed straightforward, and light reflected by the reflecting surface 68a and thereby changed in its proceeding direction by 90°.

The projector device 60 is provided with a G-PBS 69 along the proceeding direction of the illuminated light transmitted through the incident PBS 68.

The G-PBS 69 is adapted for transmitting or reflecting the illuminated light depending on the polarized light components of the illuminated light transmitted through the reflecting surface 68a of the incident PBS 68. The G-PBS 69 is configured analogously to the aforementioned diffraction prism 15 or 35 and is adapted for transmitting e.g., the P-polarized light to permit it to proceed straightforward while reflecting the S-polarized light by a reflecting surface 69a inclined 45° relative to the optical path to deflect its proceeding direction by 90°.

The G-PBS 69 transmits the illuminated light transmitted through the incident PBS 68.

The projector device 60 also includes a first liquid crystal panel 70 along the proceeding direction of light transmitted through the G-PBS 69.

The first liquid crystal panel 70 is supplied with green picture signals, among the picture signals, separated from one of the three prime colors of light to another, and demonstrates a pattern corresponding to the green light picture signals thereon. When the green light is incident on the first liquid crystal panel 70, the first liquid crystal panel modulates and reflected the so modulated light. The first liquid crystal panel 70 is a display panel, having liquid crystal molecules, sealed therein, and is able to modulate the light from one pixel to another.

The G-PBS 69 reflects the light modulated and reflected by the first liquid crystal panel 70, by the reflecting surface 69a, to deflect its proceeding direction by 90°.

The projector device 60 also includes a first R polarized light rotating element 71 and an RB-PBS 72, along the forward direction of the optical path of the illuminated light reflected by the reflecting surface 68a of the incident PBS 68.

The first R polarized light rotating element 71 is a phase difference film optimized for rotating the polarization plane of a preset wavelength band, that is a present color component, in the illuminated light reflected by the surface 68a of the incident PBS 68, by 90°, and transmitting the so rotated light, while transmitting other wavelength bands, with the polarization state of the light of these other wavelength bands remaining unchanged. Since the green color component has already been transmitted and separated by the incident PBS 68, the first R polarized light rotating element 71 rotates only the red illuminated light, in the blue and red components, reflected by the surface 68a, by 90°, and transmits the so rotated light, while transmitting the illuminated light of the remaining wavelength band, that is the blue illuminated light, with the polarization state of the blue light, without changing its polarization state.

The RB-PBS 72 is adapted for separating the illuminated light transmitted through the first R polarized light rotating element 71, on transmission or reflection, depending on the polarized light components of the illuminated light transmitted through the first R polarized light rotating element 71. The RB-PBS 72 is configured similarly to the diffraction prism 15 or 35, and is adapted for transmitting the P-polarized light to permit it to proceed straightforward, while reflecting the S-polarized light by the reflecting surface 72a inclined 45° relative to the optical path to deflect its proceeding direction by 90°.

The RB-PBS 72 separates the illuminated light transmitted through the first R polarized light rotating element 71, and the light reflected and modulated by a liquid crystal panel, as later explained, into the light transmitted through the RB-PBS 72 and allowed to proceed straightforward and the light reflected by the reflecting surface 72a and thereby changed 90° in its proceeding direction.

The projector device 60 includes a second liquid crystal panel 73 along the proceeding direction of the illuminated light transmitted through the RB-PBS 72, and a third liquid crystal panel 74 along the proceeding direction of the illuminated light reflected by the reflecting surface 72a of the RB-PBS 72.

The second liquid crystal panel 73 is supplied with red picture signals, among the picture signals, separated from one of the three prime colors of light to another, and demonstrates a pattern corresponding to the red light picture signals thereon. When the green light is incident on the second liquid crystal panel 73, the first liquid crystal panel modulates and reflected the so modulated light. The first liquid crystal panel 70 is a display panel, having liquid crystal molecules, sealed therein, and is able to modulate the light from one pixel to another.

The third liquid crystal panel 74 is supplied with blue picture signals, among the picture signals, separated from one of the three prime colors of light to another, and demonstrates a pattern corresponding to the blue light picture signals thereon. When the green light is incident on the third liquid crystal panel 74, the first liquid crystal panel modulates and reflected the so modulated light. The first liquid crystal panel 70 is a display panel, having liquid crystal molecules, sealed therein, and is able to modulate the light from one pixel to another.

In the RB-PBS 72, the light modulated and reflected by the second liquid crystal panel 73 is reflected by the reflecting surface 72a and is thereby changed by 90° in its proceeding direction, while the light modulated and reflected by the third liquid crystal panel 74 is transmitted through the RB-PBS 72 straightforward.

The projector device 60 also includes a second R polarized light rotating element 75, along the forward direction of the optical path of the light reflected by the reflecting surface 72a of the RB-PBS 72 and modulated by the second liquid crystal panel 73 and the light transmitted through the RB-PBS 72 and modulated by the third liquid crystal panel 74.

The second R polarized light rotating element 75 is a phase difference film optimized for rotating the polarization plane of a preset wavelength band, that is a present color component, in the light reflected by the reflecting surface 72a of the RB-PBS 72 and modulated by the second liquid crystal panel 73 and the light transmitted through the RB-PBS 72 and modulated by the third liquid crystal panel 74, and transmitting the so rotated light, while transmitting other wavelength bands, with the polarization state of the light of these other wavelength bands remaining unchanged. Since the green color component has already been transmitted and separated by the incident PBS 68, the second R polarized light rotating element 75 rotates only the red illuminated light, in the blue and red components, reflected by the incident PBS 68, by 90°, and transmits the so rotated light, while transmitting the illuminated light of the remaining wavelength band, that is the blue illuminated light, with the polarization state of the blue light, without changing its polarization state.

The projector device 60 also includes a radiating PBS 76, along the proceeding direction of the light reflected by the reflecting surface 69a of the G-PBS 69 and modulated by the first liquid crystal panel 70, and along the proceeding direction of the light transmitted through the second R polarized light rotating element 75 and modulated by the second liquid crystal panel 73 and the reflected light transmitted through the third liquid crystal panel 74.

The radiating PBS 76 is adapted for combining, on transmission or reflection of the polarized light components, the light reflected by the reflecting surface 69a of the G-PBS 69, the light transmitted through the second R polarized light rotating element 75 and modulated by the second liquid crystal panel 73 and the light reflected and modulated by the third liquid crystal panel 74. The radiating PBS 76 is configured similarly to the diffraction prism 15 or 35, and is adapted for transmitting the P-polarized light, while reflecting the S-polarized light by the reflecting surface 76a inclined 45° relative to the optical path to deflect its proceeding direction by 90°.

The radiating PBS 76 is adapted for reflecting the light, reflected by the reflecting surface 69a of the G-PBS 69 and modulated by the first liquid crystal panel 70, by its reflecting surface 76a, while transmitting the light transmitted through the second R polarized light rotating element 75 and modulated by the second liquid crystal panel 73 and the light reflected and modulated by the third liquid crystal panel 74, to permit the light to proceed straightforward to output the light in the same direction.

The projector device 60 also includes a second G polarization rotating element 77, a radiating polarization plate and a projection lens 78, along the forward direction of the optical path of the light reflected by the reflecting surface 76a of the radiating PBS 76, the light transmitted through the radiating PBS 76 and modulated by the second liquid crystal panel 73 and the light reflected and modulated by the third liquid crystal panel 74.

The second G polarization rotating element 77 is a phase difference film optimized for rotating the polarization plane of a green wavelength band, that is a green color component, in the light reflected by the reflecting surface 76a of the radiating PBS 76, the light transmitted through the radiating PBS 76 and modulated by the second liquid crystal panel 73 and the light reflected and modulated by the third liquid crystal panel 74, while transmitting other wavelength bands, that is red and blue components, with the polarization state of the light of these other wavelength bands remaining unchanged.

A radiating polarization plate 78 is adapted for transmitting only preset polarized light components of the light transmitted through the second G polarization rotating element 77 and modulated by the first liquid crystal panel 70, the light reflected and modulated by the second liquid crystal panel 73 and the light reflected and modulated by the third liquid crystal panel 74, and is adapted for transmitting only the component of the P-polarized light.

A projection lens 79 is a lens for enlarging and projecting the reflected light transmitted through a radiating polarizing plate 78 and modulated by the first liquid crystal panel 70, the reflected light modulated by the second liquid crystal panel 73 and the reflected light modulated by the third liquid crystal panel 74, is adapted for projecting an image on a screen, not shown.

The operation of various components of the projector device 60, described above, is now explained, mainly along the path of the illuminated light radiated from the lamp 61.

The illuminated light, radiated from the lamp 61, contains wavelength bands of red, green and blue, as three prime colors, and is led to the fly-eye integrator 62 as non-polarized light.

The illuminated light, led to the fly-eye integrator 62, is uniformed by the fly-eye integrator 62 in its illuminance distribution, to fall on the PS conversion synthesis element 63.

The illuminated light incident on the PS conversion synthesis element 63 has its S-polarized light directly transmitted therethrough, while having its P-polarized light converted into the S-polarized light. Thus, the light is incident as all S-polarized light to the main condenser 64.

The illuminated light incident on the main condenser 64 is collected by the main condenser 64 and thence led to the field lens 65 and to the pre-polarization plate 66.

The illuminated light incident on the pre-polarization plate 66 has its polarized light components further put into order and is led as the S-polarized light to the first G polarization rotating element 67.

The illuminated light, incident on the first G polarization rotating element 67, has the polarization plane only of its green wavelength band rotated 90°, so that this wavelength band is put in order into the P-polarized light which is transmitted and led to the incident PBS 68. The components of the red ad blue wavelength bands are transmitted as S-polarized light so as to be led to the incident PBS 68.

The illuminated light led to the incident PBS 68 is the P-polarized light of the green wavelength range and the red and blue wavelength range. Only the P-polarized light is transmitted and proceeds straightly through the reflecting surface 68a of the incident PBS 68, while the S-polarized light is reflected by the reflecting surface 68a and changed in its proceeding direction. That is, the illuminated light of the green wavelength range is transmitted through the incident PBS 68 to proceed straight to the G-PBS 69, while the illuminated light of the red and blue wavelength range is reflected by the reflecting surface 68a of the incident PBS 68 and is thereby changed 90° in its proceeding direction to get to the first R polarized light rotating element 71.

The optical path of the green wavelength range light of the illuminated light, separated by the incident PBS 68, transmitted through the incident PBS 68 and led to the G-PBS 69, is hereinafter explained.

The illuminated light led to the G-PBS 69 is the P-polarized light of the green wavelength range and is transmitted straight through the G-PBS 69 to the first liquid crystal panel 70.

The illuminated light led to the first liquid crystal panel 70 is the P-polarized light of the green wavelength range, and is modulated and reflected by the first liquid crystal panel 70, on which has been displayed a pattern corresponding to the green picture signals, so that its proceeding direction is changed by 180°. At this time, the S-polarized light is generated and returned to the G-PBS 69.

The reflected light from the first liquid crystal panel 70, returned to the diffraction prism 15, is made up by the S-polarized light and the P-polarized light, which is the unneeded OFF light. The S-polarized light is reflected by the reflecting surface 69a, and led to the radiating PBS 76, as it is changed in its proceeding direction by 90°, while the P-polarized light is transmitted through the reflecting surface 69a and returned to the lamp 61.

The reflected light from the first liquid crystal panel 70, led to the radiating PBS 76, is the S-polarized light of the green wavelength range. This S-polarized light is reflected by the reflecting surface 76a of the radiating PBS 76, so as to be changed in its proceeding direction. The so reflected light is led to the second G polarization rotating element 77.

The reflected light from the first liquid crystal panel 70, led to the radiating PBS 76, is the S-polarized light of the green wavelength range, which has the polarization plane of the green wavelength range rotated 90° by the second G polarization rotating element 77 and is thereby put in order into P-polarized light. This P-polarized light is led to the radiating polarizing plate 78.

The reflected light from the first liquid crystal panel 70, led to the radiating polarizing plate 78, is the P-polarized light of the green wavelength range, which has its polarized light components put in order into P-polarized light by the radiating polarizing plate 78 and led in this state to the projection lens 79.

The optical path of the illuminated light of the red and blue wavelength range, separated by the incident PBS 68 and reflected on the reflecting surface 68a of the incident PBS 68 to proceed along a 90° changed optical path, is hereinafter explained.

The illuminated light led to the first R polarized light rotating element 71 is the S-polarized light of the red and blue wavelength range. Only the polarization plane of the red wavelength is rotated 90° by the first R polarized light rotating element 71 to generate P-polarized light which is led to the RB-PBS 72.

The illuminated light led to the RB-PBS 72 is the P-polarized light of the red wavelength range and the S-polarized light of the blue wavelength range. The P-polarized light of the blue wavelength range is transmitted through the reflecting surface 72a of the RB-PBS 72 to reach the second liquid crystal panel 73, while the S-polarized light of the blue wavelength range is reflected by the reflecting surface 72a of the RB-PBS 72 to reach the third liquid crystal panel 74.

The illuminated light led to the second liquid crystal panel 73 is the P-polarized light of the red wavelength range, which is reflected and modulated by the second liquid crystal panel 73, having a pattern corresponding to red picture signals displayed thereon. The so reflected light is changed 180° in its proceeding direction. The S-polarized light, generated in the interim, is returned to the RB-PBS 72.

The illuminated light led to the third liquid crystal panel 74 is the S-polarized light of the blue wavelength range, which is reflected and modulated by the third liquid crystal panel 74, having a pattern corresponding to blue picture signals displayed thereon. The so reflected light is changed 180° in its proceeding direction. The P-polarized light, generated in the interim, is returned to the RB-PBS 72.

The reflected light from the second liquid crystal panel 73, returned to the RB-PBS 72, is the S-polarized light of the red wavelength range, and the P-polarized light, which is the unneeded OFF light. The P-polarized light is reflected by the reflecting surface 72a of the RB-PBS 72, and led to the second R polarized light rotating element 75, as it is changed in its proceeding direction by 90°. The reflected light from the third liquid crystal panel 74, returned to the RB-PBS 72, is the P-polarized light of the blue wavelength range, and the S-polarized light, which is the unneeded OFF light. The S-polarized light is reflected by the reflecting surface 72a of the RB-PBS 72, and is transmitted through the reflecting surface 72a of the RB-PBS 72 and led to the second R polarized light rotating element 75.

The reflected light from the second liquid crystal panel 73, led to the second R polarized light rotating element 75, is the S-polarized light of the red wavelength range. This S-polarized light has its polarization plane rotated 90° by the second R polarized light rotating element 75 so as to be thereby put in order into P-polarized light. This P-polarized light is led to the radiating PBS 76. The reflected light from the third liquid crystal panel 74, led to the second R polarized light rotating element 75, is the P-polarized light of the blue wavelength range. This P-polarized light is transmitted through the second R polarized light rotating element 75 and thence sent to the radiating PBS 76.

The reflected light from the second liquid crystal panel 73, led to the radiating PBS 76, is the P-polarized light of the red wavelength range, which is transmitted through the reflection surface 76a of the radiating PBS 76 to proceed straightforward to the second G polarization rotating element 77. The reflected light from the third liquid crystal panel 74, led to the radiating PBS 76, is the P-polarized light of the blue wavelength range, and is transmitted straightforward through the reflection surface 76a of the radiating PBS 76 to get to the second G polarization rotating element 77.

The reflected light from the second liquid crystal panel 77, led to the radiating PBS 76, is the P-polarized light of the red wavelength range, which is transmitted through the reflection surface 76a of the radiating PBS 76 to proceed straightforward to get to the radiating polarizing plate 78. The reflected light from the third liquid crystal panel 74, led to the second G polarization rotating element 77, is the P-polarized light of the blue wavelength range, and is transmitted through the reflection surface 76a of the radiating PBS 76 to proceed straightforward to get to the radiating polarizing plate 78.

The reflected light from the second liquid crystal panel 73, led to the radiating polarizing plate 78, is the P-polarized light of the red wavelength range, and has the polarized light components put in order into the P-polarized light by the radiating polarizing plate 78. The P-polarized light is transmitted through the radiating polarizing plate 78 and led to the projection lens 79. The reflected light from the third liquid crystal panel 74, led to the radiating polarizing plate 78, is the P-polarized light of the blue wavelength range, and has the polarized light components put in order into the P-polarized light by the radiating polarizing plate 78. The P-polarized light is transmitted through the radiating polarizing plate 78 and led to the projection lens 79.

Thus, the light of the respective wavelength ranges, separated into three optical paths by the incident PBS 68 and the RB-PBS 72, is incident on liquid crystal panels, adapted to the respective wavelength ranges, as illuminated light, so as to be modulated and reflected by the respective liquid crystal panels. The reflected light, modulated by the respective liquid crystal panels, are combined by the radiating PBS 76 and thence sent to the projection lens 79 so as to be projected enlarged on e.g., a screen.

By employing the diffraction prism 15 or 35 as the incident PBS 68, G-PBS 69, RB-PBS 72 or as the radiating PBS 76, the favorable effects comparable to those achieved with the projector device 10 or 30 may be achieved with the projector device 60.

Figure 10:
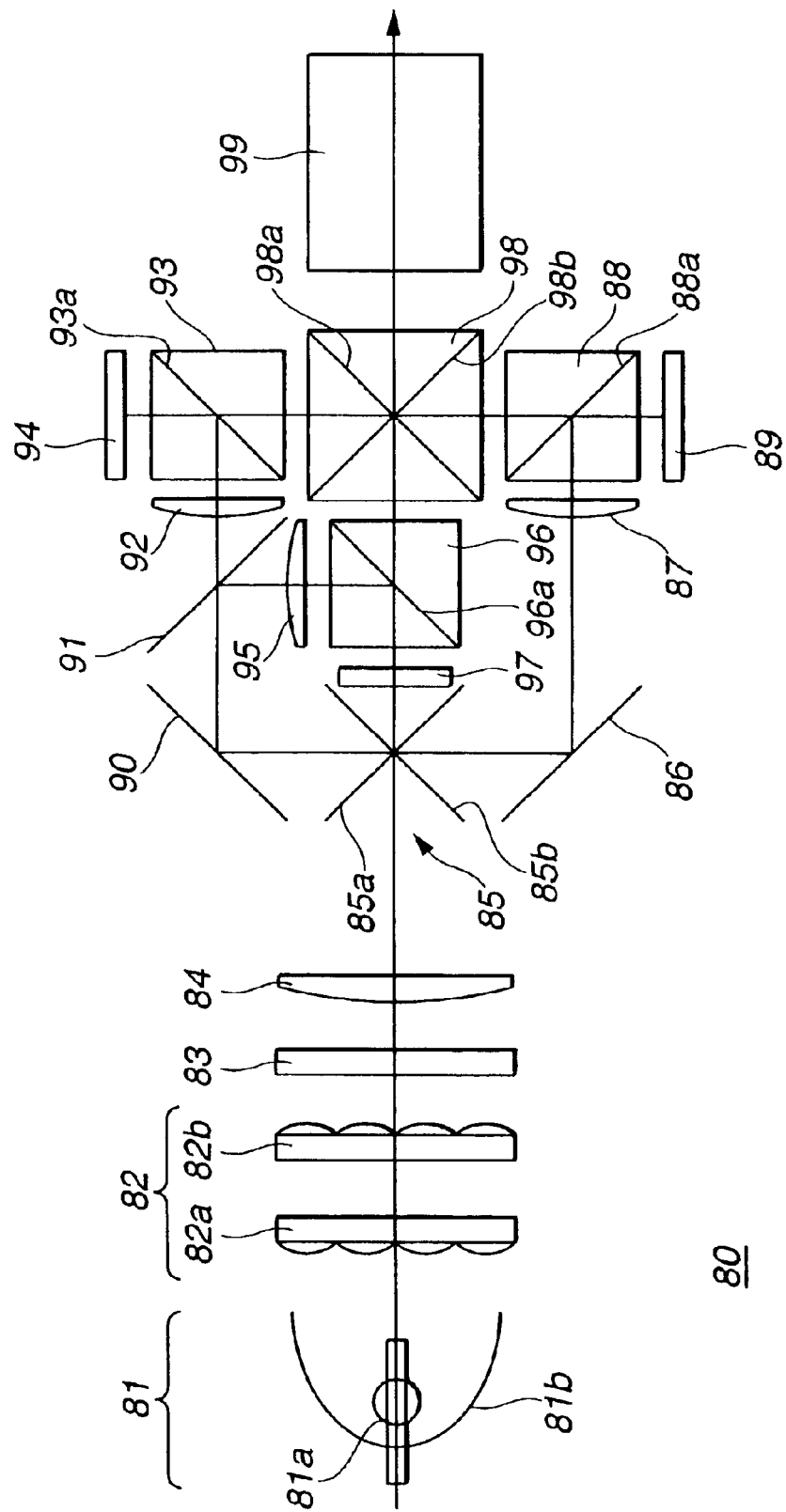
FIG. 10 shows still another structure of a projector device embodying the present invention.

A projector device 80, adapted for projecting a color image according to the present invention, shown in FIG. 10, is hereinafter explained.

The projector device 80 includes a lamp 81, as a light source radiating the illuminated light. Additionally, the projector device 80 includes a fly-eye integrator 82, a PS conversion synthesis element 83, a main condenser 84 and a cross-cross-dichroic mirror 85.

The lamp 81 is adapted for radiating white light containing the light of wavelength bands for three prime colors of light, namely red, green and blue, as required for displaying a color image. This lamp 81 includes a light emitting element 81a, generating white light, and a reflector 81b for reflecting the light emitted by the light emitting element 81a. The light emitting element 81a that may be used includes a high-pressure mercury lamp, a halogen lamp, a metal halide lamp or a xenon lamp. As the reflector 81b of the lamp 81, a concave mirror is used. Such a mirror is preferred which has a mirror surface of high perimetrical efficiency. For example, the reflector is of the type of a symmetrical rotation, such as a paraboloid revolution or a spheroidal revolution.

In order for the illuminated light, radiated from the lamp 81, to illuminate an effective area of the liquid crystal panel, as later explained, the fly-eye integrator 82 is designed and constructed so that the illuminated light is the light beam shaped to conform to the shape of the effective area of the liquid crystal panel to provide for uniform illuminance distribution. This fly-eye integrator 82, also termed a multilens array, is comprised of two sets each comprised of an array of plural small-sized convex lenses. One of the arrays 82a towards the lamp 81 collects the illuminated light from the lamp 81 to form small light source spots, while the other array 82b combines the illuminated light from the respective light source spots.

For effective utilization of the illuminated light from the lamp 81, the PS conversion synthesis element 83 is adapted for putting the polarized light components of the illuminated light into order. The PS conversion synthesis element 83 is formed by a λ/2 plate or a polarized beam splitter and is adapted for converting e.g., the P-polarized light into S-polarized light. Specifically, the PS conversion synthesis element 83 is able to transmit the S-polarized light of the incident illuminated light, while converting the P-polarized light into the S-polarized light, which is issued as output, so that the illuminated light in its entirety may be converted into S-polarized light.

The main condenser 84 is a convex lens for collecting the illuminated light transmitted through the PS conversion synthesis element 83.

The cross-cross-dichroic mirror 85 is designed and constructed so that the illuminated light collected by the main condenser 84 may be separated by being reflected by a reflecting surface 85a or 85b, inclined 45° with respect to the optical path and extending at right angles to each other, depending on the wavelength ranges of the illuminated light collected by the main condenser 84. The cross-dichroic mirror 85 is formed by e.g., a dielectric multilayer film and is designed and constructed so that the light of the blue wavelength range is reflected by the reflecting surface 85a inclined 45° relative to the optical path so as to be thereby changed 90° in its proceeding direction, and so that the light of the red and green wavelength range is reflected by the reflecting surface 85a inclined 45° relative to the optical path so as to be thereby changed 90° in its proceeding direction.

In the cross-dichroic mirror 85, the illuminated light collected by the main condenser 84 is separated into light reflected by the reflecting surface 85a of the cross-dichroic mirror 85 so as to be changed 90° in its proceeding direction and into light reflected by the reflecting surface 85b thereof so as to be changed 90° in its proceeding direction.

The projector device 80 also includes a first plane mirror 86, a first field lens 87, a B-PBS 88 and a first liquid crystal panel 89, along the forward direction of the illuminated light reflected by the reflecting surface 85a of the cross-dichroic mirror 85.

The first plane mirror 86 is a flat mirror, provided for reflecting the incident light, and which is arranged at an angle of 45° relative to the proceeding direction of the illuminated light reflected by the reflecting surface 85a of the cross-dichroic mirror 85.

The first field lens 87 is a convex lens adapted for collecting the illuminated light reflected by the first plane mirror 86 onto the first liquid crystal panel 89.

The B-PBS 88 is designed for separating the illuminated light transmitted through the first field lens 87 by transmission or reflection depending on the polarized light components. The B-PBS 88 is configured similarly to the diffraction prism 15 or 35, described above, and is adapted for transmitting the P-polarized light to permit it to proceed straightforward, and for reflecting the S-polarized light on a reflecting surface 88a, inclined 45° relative to the optical path, to deflect its proceeding direction by 90°.

The first liquid crystal panel 89 is supplied with blue picture signals, from among the picture signals, separated into three prime colors, and displays a pattern corresponding to the blue picture signals. The first liquid crystal panel is adapted for modulating and reflecting the illuminated light incident thereon. This first liquid crystal panel 89 is a liquid crystal panel, having liquid crystal molecules sealed therein, and is able to modulate light from one pixel to another.

The B-PBS 88 separates the illuminated light transmitted through the first field lens 87 and the light modulated and reflected by the first liquid crystal panel 89 into light transmitted through the B-PBS 88 and thence proceeding straightforward and light reflected by the reflecting surface 88a so as to be changed 90° in its proceeding direction.

The projector device 80 also includes a second plane mirror 90 and a dichroic mirror 91, along the forward optical path of the illuminated light reflected by the reflecting surface 85b of the cross-dichroic mirror 85.

The second plane mirror 90 is a plane mirror provided for reflecting the incident light and is arranged at an inclination of 45° relative to the proceeding direction of the illuminated light reflected by the reflecting surface 85b of the cross-dichroic mirror 85.

The dichroic mirror 91 is provided at an inclination of 45° relative to the optical path of the illuminated light reflected by the second plane mirror 90, and is adapted for separating the illuminated light reflected by the second plane mirror 90 on transmission or reflection depending on its wavelength band. The dichroic mirror 91 is formed by e.g., a dielectric multilayer film adapted for reflecting the light of e.g., the light of the green wavelength range at a reflection surface 91a inclined 45° relative to the optical path, while transmitting the light of the red wavelength band to permit it to proceed straightforward.

The projector device 80 also includes a second field lens 92, an R-PBS 93 and a second liquid crystal panel 94, along the forward optical path of the illuminated light transmitted through the dichroic mirror 91.

The second field lens 92 is a convex lens for collecting the illuminated light, transmitted through the dichroic mirror 91, onto the second liquid crystal panel 94.

The R-PBS 93 is adapted for separating the illuminated light, transmitted through the second field lens 92, depending on the polarized light components of the illuminated light. This R-PBS 93 is configured similarly to the diffraction prism 15 or 35, described above, and is adapted for transmitting the P-polarized light to permit it to travel straightforward, while reflecting the S-polarized light on a reflecting surface 93a, inclined 45° relative to the optical path, to deflect its proceeding direction by 90°.

The second liquid crystal panel 94 is supplied with red picture signals, from among the picture signals, separated into three prime colors, and displays a pattern corresponding to the blue picture signals. The first liquid crystal panel is adapted for modulating and reflecting the illuminated light incident thereon. This second liquid crystal panel 94 is a liquid crystal panel, having liquid crystal molecules sealed therein, and is able to modulate light from one pixel to another.

The B-PBS 93 separates the illuminated light, transmitted through the second field lens 92 and the light modulated and reflected by the second liquid crystal panel 94, into light transmitted through the B-PBS 93 and thence proceeding straightforward and light reflected by the reflecting surface 93a so as to be changed 90° in its proceeding direction.

The projector device 80 also includes a third field lend 95, a G-PBS 96 and a third liquid crystal panel 97, along the forward optical path of the illuminated light reflected by the dichroic mirror 91.

The third field lend 95 is a convex lens adapted for collecting the illuminated light reflected on the dichroic mirror 91 onto the third liquid crystal panel 97.

The G-PBS 96 is adapted for separating the illuminated light transmitted through the third field lend 95 on transmission or reflection depending on the polarized light components of the illuminated light. This G-PBS 93 is configured similarly to the diffraction prism 15 or 35, described above, and is adapted for transmitting the P-polarized light to permit it to travel straightforward, while reflecting the S-polarized light on a reflecting surface 96a, inclined 45° relative to the optical path, to deflect its proceeding direction by 90°.

The second liquid crystal panel 97 is supplied with green picture signals, from among the picture signals, separated into three prime colors, and displays a pattern corresponding to the green picture signals. The third liquid crystal panel is adapted for modulating and reflecting the illuminated light incident thereon. This second liquid crystal panel 97 is a liquid crystal panel, having liquid crystal molecules sealed therein, and is able to modulate light from one pixel to another.

The G-PBS 96 separates the illuminated light, transmitted through the third field lens 95 and the light modulated and reflected by the third liquid crystal panel 97, into light transmitted through the G-PBS 96 and thence proceeding straightforward and light reflected by the reflecting surface 96a so as to be changed 90° in its proceeding direction.

The projector device 80 also includes a synthesizing prism 98 along the proceeding direction of the reflected light, transmitted through the B-PBS 88 and modulated by the first liquid crystal panel 89, the reflected light transmitted through the R-PBS 93 and modulated by the second liquid crystal panel 94 and the reflected light transmitted through the G-PBS 96 and modulated by the third liquid crystal panel 97.

The synthesizing prism 98 is adapted for synthesizing the reflected light, transmitted through the B-PBS 88 and modulated by the first liquid crystal panel 89, the reflected light transmitted through the R-PBS 93 and modulated by the second liquid crystal panel 94 and the reflected light transmitted through the G-PBS 96 and modulated by the third liquid crystal panel 97, on transmission or reflection, depending on the wavelength band. The synthesizing prism 98 is comprised of dielectric multilayer films sandwiched by prisms so that the respective film surfaces cross each other. For example, the synthesizing prism 98 reflects the light of the blue wavelength range by a reflecting surface 98a, inclined 45° relative to the optical path, to deflect its proceeding direction by 90°, while reflecting the light of the red wavelength range by a reflecting surface 99b, inclined 45° relative to the optical path, to deflect its proceeding direction by 90° and transmitting the light of the red wavelength band to permit it to proceed straightforward.

The synthesizing prism 98 reflects the reflected light, transmitted through the B-PBS 88 and modulated by the first liquid crystal panel 89, on its reflecting surface 98a to deflect its proceeding direction by 90°, while reflecting the reflected light, transmitted through the R-PBS 93 and modulated by the second liquid crystal panel 94, on its reflecting surface 98b to deflect its proceeding direction by 90° and transmitting the reflected light transmitting through the G-PBS 96 and modulated by the third liquid crystal panel 97 to permit it to proceed straightforward, thus outputting the first-stated reflected light to third-stated reflected light in the same direction.

The projector device 80 also includes a projector lens 99 along the proceeding direction of the reflected light reflected by the reflecting surface 98a of the synthesizing prism 98 and modulated by the first liquid crystal panel 89, the reflected light reflected by the reflecting surface 98b of the synthesizing prism 98 and modulated by the second liquid crystal panel 94 and the reflected light transmitted through the synthesizing prism 98 and modulated by the third liquid crystal panel 97.

The projector lens 99 is a convex lens, adapted for enlarging and projecting the reflected light reflected by the reflecting surface 98a of the synthesizing prism 98 and modulated by the first liquid crystal panel 89, the reflected light reflected by the reflecting surface 98b of the synthesizing prism 98 and modulated by the second liquid crystal panel 94 and the reflected light transmitted through the synthesizing prism 98 and modulated by the third liquid crystal panel 97. The projector lens projects the enlarged image on a screen, not shown.

The operation of the above-described projector device 80 is now explained along the optical path of the illuminated light radiated from the lamp 81.

The illuminated light radiated from the lamp 81 contains wavelength bands of three prime colors of light, namely red, green and blue, and is led as non-polarized light to the fly-eye integrator 82.

The illuminated light, led to the fly-eye integrator 82, is transmitted through the fly-eye integrator 82, as it is uniformed by the fly-eye integrator 82 in its illuminance distribution, to fall on the PS conversion synthesis element 83.

The illuminated light incident on the PS conversion synthesis element 83 has its S-polarized light directly transmitted therethrough, while having its P-polarized light converted into the S-polarized light. Thus, the light is incident as all S-polarized light to the main condenser 84.

The illuminated light incident on the main condenser 84 is collected by the main condenser 84 to fall on the cross-dichroic mirror 85.

The illuminated light incident on the cross-dichroic mirror 85 is the S-polarized light containing all of the wavelength bands of red, green and blue. Of these, the blue wavelength band is reflected by the reflecting surface 85a and thereby deflected in the proceeding direction by 90°, while red and green wavelength bands are reflected by the reflecting surface 85b and thereby deflected in the proceeding direction by 90°. It is noted that the illuminated light of the blue wavelength band is separated from the illuminated light of the red and green wavelength bands so that the respective proceeding directions are 180° different from each other, with the illuminated light of the blue wavelength band and the illuminated light of the red and green wavelength bands being led to the first and second plane mirrors 86, 90, respectively.

The optical path of the illuminated light of the blue wavelength band, reflected by the reflecting surface 85a of the cross-dichroic mirror 85 and thence sent to the first plane mirror 86, in the illuminated light separated by the cross-dichroic mirror 85, is hereinafter explained.

The illuminated light led to the first plane mirror 86 is the S-polarized light of the blue wavelength range and is reflected by the first plane mirror 86 and thence sent to the first field lens 87.

The illuminated light led to the first field lens 87 is the S-polarized light of the blue wavelength range and is collected by the first field lens 87 on the and thence sent to the first liquid crystal panel 89 by the first field lens 87 so as to be sent to the B-PBS 88.

The illuminated light led to the B-PBS 88 is the S-polarized light of the blue wavelength range and is reflected by the reflecting surface 88a of the B-PBS 88 and thence sent to the first liquid crystal panel 89.

The illuminated light led to the first liquid crystal panel 89 is the S-polarized light of the blue wavelength range, and is modulated and reflected by the first liquid crystal panel 89, having displayed thereon a pattern corresponding to the blue picture signals, so that its proceeding direction is deflected by 180°. The P-polarized light, generated at this time, is returned to the B-PBS 88.

The reflected light from the first liquid crystal panel 89, returned to the B-PBS 88, is the P-polarized light of the blue wavelength range and the S-polarized light as OFF light. The P-polarized light is transmitted through the reflecting surface 88*a* of the B-PBS 88 and thence sent to the synthesizing prism 98, while the S-polarized light is reflected by the reflecting surface 88*a* and is thereby deflected in its proceeding direction by 90° and returned to the first field lens 87.

The reflected light, led to the synthesizing prism 98 and modulated by the first liquid crystal panel 89, is reflected by the reflecting surface 98*a* of the synthesizing prism 98 and is thereby deflected in its proceeding direction by 90° and led to the projector lens 99.

The optical path of the illuminated light of the red and green wavelength bands, reflected by the reflecting surface 85*b* cross-dichroic mirror 85 and thence sent to the first plane mirror 86, in the illuminated light separated by the cross-dichroic mirror 85, is hereinafter explained.

The illuminated light led to the second plane mirror 90 is the S-polarized light of the red and green wavelength bands and is reflected by the second plane mirror 90 and thence sent to the dichroic mirror 91.

The illuminated light led to the dichroic mirror 91 is the S-polarized light of the red and green wavelength bands. The red wavelength band is transmitted through the dichroic mirror 91 and thence sent to the second field lens 92, while the green wavelength band is reflected by the dichroic mirror 91 and thence led to the third field lend 95.

The optical path of the illuminated light of the red wavelength band, transmitted through the cross-dichroic mirror 85 and thence sent to the second field lens 92, is hereinafter explained.

The illuminated light led to the second field lens 92 is the S-polarized light of the red wavelength band and is collected by the second field lens 92 to the second liquid crystal panel 94 so as to be sent to the R-PBS 93.

The illuminated light led to the R-PBS 93 is the S-polarized light of the red wavelength band and is reflected by the reflecting surface 93*a* of the R-PBS 93 and deflected in its proceeding direction by 90° so as to be then led to the second liquid crystal panel 94.

The illuminated light led to the second liquid crystal panel 94 is the S-polarized light of the red wavelength band, and is modulated and reflected by the second liquid crystal panel 94, having displayed thereon a pattern corresponding to red picture signals, so as to be deflected in its proceeding direction by 180°. The P-polarized light, generated at this time, is returned to the R-PBS 93.

The reflected light from the second liquid crystal panel 94, returned to the R-PBS 93, is the P-polarized light of the red wavelength range and the S-polarized light as the OFF light. The P-polarized light is transmitted through the reflecting surface 93*a* of the R-PBS 93 and thence led to the synthesizing prism 98, while the S-polarized light is reflected by the reflecting surface 93*a* and thereby deflected 90° in its proceeding direction so as to be then returned to the field lens 92.

The reflected light led to the synthesizing prism 98 and modulated by the second liquid crystal panel 94 is deviated 90° in its proceeding direction by reflection on the reflecting surface 98*a* synthesizing prism 98 and thence led to the projector lens 99.

The optical path of the illuminated light of the green wavelength band, reflected by the dichroic mirror 91 and thence sent to the third field lend 95, in the illuminated light separated by the dichroic mirror 91, is hereinafter explained.

The illuminated light led to the third field lend 95 is the S-polarized light of the green wavelength band and is collected by the third field lend 95 to the third liquid crystal panel 97 so as to be sent to the G-PBS 96.

The illuminated light led to the G-PBS 96 is the S-polarized light of the green wavelength band and is reflected by the reflecting surface 96*a* of the G-PBS 96 so as to be deflected 90° in its proceeding direction and sent to the third liquid crystal panel 97.

The illuminated light led to the third liquid crystal panel 97 is the S-polarized light of the green wavelength band, and is modulated and reflected by the third liquid crystal panel 97, having displayed thereon a pattern corresponding to green picture signals, so as to be deflected in its proceeding direction by 180°. The P-polarized light, generated at this time, is returned to the G-PBS 96.

The reflected light from the third liquid crystal panel 97, returned to the G-PBS 96, is the P-polarized light of the green wavelength range and the S-polarized light as the OFF light. The P-polarized light is transmitted through the reflecting surface 96*a* of the G-PBS 96 and thence led to the synthesizing prism 98, while the S-polarized light is reflected by the reflecting surface 96*a* and thereby deflected 90° in its proceeding direction so as to be then returned to the third field lens 95.

The reflected light, led to the synthesizing prism 98 and modulated by the third liquid crystal panel 97, is transmitted through the synthesizing prism 98 to proceed straightforward to reach the projector lens 99.

Thus, the light of the respective wavelength bands, separated by the cross-dichroic mirror 85 and by the dichroic mirror 91 into three optical paths, is incident illuminated light, so as to be modulated and reflected by the respective liquid crystal panels. The reflected light, modulated by the respective liquid crystal panels, is synthesized by the synthesizing prism 98 and led to the projector lens 99 so as to be thereby projected on e.g., a screen.

By employing the aforementioned diffraction prism 15 or 35 for each of the incident PBS 68, G-PBS 69, RB-PBS 72 and the radiating PBS 76, the favorable effects similar to those obtained with the projector device 10 or the projector device 30 may be obtained with the projector device 60.

Moreover, by employing the aforementioned diffraction prism 15 or 35 for each of the B-PBS 88, R-PBS 93 the G-PBS 96, the favorable effects similar to those obtained with the projector device 10 or the projector device 30 may be obtained with the projector device 80.

Figure 11:
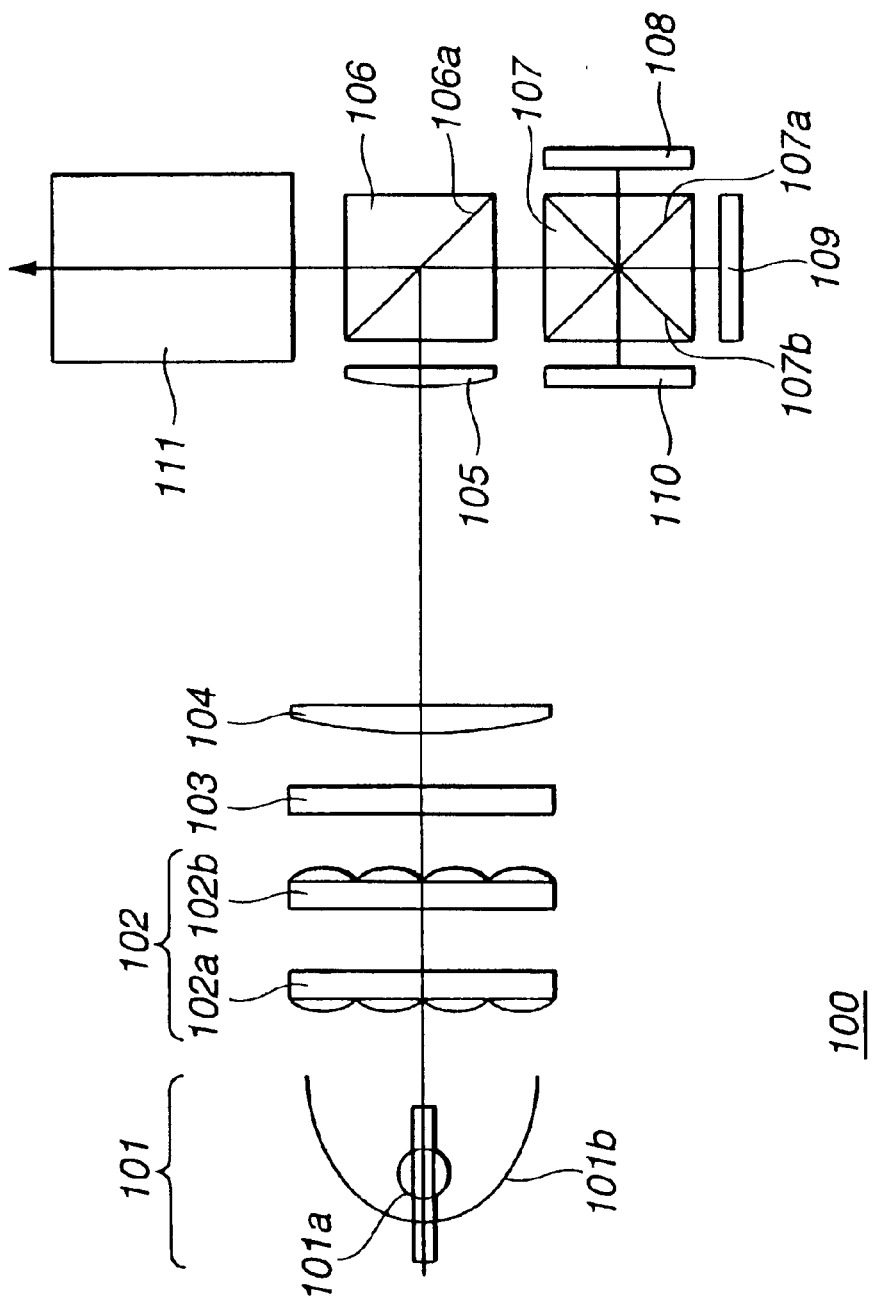
FIG. 11 shows a further structure of a projector device embodying the present invention.

As a projector device adapted for projecting a color image according to the present invention, a projector device 100 shown in FIG. 11 is now explained.

The projector device 100 includes a lamp 101 as a light source for radiating the illuminated light. The projector device 100 also includes a fly-eye integrator 102, a PS conversion synthesis element 103, a main condenser 104 a field lens 105 and a PBS 106.

The lamp 101 is adapted for radiating white light containing the light of wavelength bands for three prime colors of light, namely red, green and blue, as required for displaying a color image. This lamp 81 includes a light emitting element 101*a*, generating white light, and a reflector 101*b* for reflecting the light emitted by the light emitting element 101*a*. The light emitting element 101*a* that may be used includes a high-pressure mercury lamp, a halogen lamp, a metal halide lamp or a xenon lamp. As the reflector 101*b* of the lamp 101, a concave mirror is used. Such a mirror is preferred which has a mirror surface of high perimetrical efficiency. For example, the reflector is of the type of a symmetrical rotation, such as a paraboloid revolution or a spheroidal revolution.

In order for the illuminated light, radiated from the lamp 101, to illuminate an effective area of the liquid crystal panel, as later explained, the fly-eye integrator 102 is designed and constructed so that the illuminated light is the light beam shaped to conform to the shape of the effective area of the liquid crystal panel to provide for uniform illuminance distribution. This fly-eye integrator 102, also termed a multi-lens array, is comprised of two sets each comprised of an array of plural small-sized convex lenses. One of the arrays 102a towards the lamp 101 collects the illuminated light from the lamp 101 to form small light source spots, while the other array 102b combines the illuminated light from the respective light source spots.

For effective utilization of the illuminated light from the lamp 101, the PS conversion synthesis element 103 is adapted for putting the polarized light components of the illuminated light into order. The PS conversion synthesis element 103 is formed by a λ/2 plate or a polarized beam splitter and is adapted for converting e.g., the P-polarized light into S-polarized light. Specifically, the PS conversion synthesis element 103 is able to transmit the S-polarized light of the incident illuminated light, while converting the P-polarized light into the S-polarized light, which is issued as output, so that the illuminated light in its entirety may be converted into S-polarized light.

The main condenser 104 is a convex lens for collecting the illuminated light transmitted through the PS conversion synthesis element 103.

The field lens 105 is a convex lens for further collecting the illuminated light, collected by the main condenser 104, on three liquid crystal panels, as later explained. These collecting lenses are not limited to convex lenses. For example, the function of the main condenser 104 may also be achieved by offsetting the lens elements of the multi-lens array 102b of the fly-eye integrator 102 with respect to the lens elements of the multi-lens array 102a The BS 106 is adapted for separating the illuminated light transmitted through the field lens 105 on transmission or reflection depending on the polarized light components of the illuminated light. The PBS 106 is configured similarly to the diffraction prism 15 or 35, described above, such that the P-polarized light is transmitted and allowed to proceed straightforward, with the S-polarized light being deflected 90° in its proceeding direction by being reflected on the reflecting surface 106a, inclined 45° relative to the optical path.

The projector device 100 also includes a separating and synthesizing prism 107 along the proceeding direction of the illuminated light reflected by a reflecting surface 106a of the PBS 106.

The separating and synthesizing prism 107 is adapted for separating the illuminated light reflected by the reflecting surface 106a of the PBS 106, by reflection or by transmission through the reflection surfaces 107a, 107b, which are inclined 45° relative to the optical path and which extend at right angles to each other, depending on the wavelength ranges of the illuminated light. The separating and synthesizing prism 107 is comprised of dielectric multilayer films sandwiched by prisms so that the respective film surfaces cross each other. For example, the separating and synthesizing prism reflects the light of the blue wavelength range by a reflecting surface 107a, inclined 45° relative to the optical path, to deflect its proceeding direction by 90°, while transmitting the light of the green wavelength band to permit it to proceed straightforward and reflecting the light of the red wavelength range by a reflecting surface 107b, inclined 45° relative to the optical path, to deflect its proceeding direction by 90°.

The projector device 100 also includes a first liquid crystal panel 108, along the proceeding direction of the illuminated light, reflected by the reflecting surface 107a of the separating and synthesizing prism 107, a first liquid crystal panel 108, a second liquid crystal panel 109, along the proceeding direction of the illuminated light, transmitted through the reflecting surface 107b of the separating and synthesizing prism 107, and a third liquid crystal panel 110, along the proceeding direction of the illuminated light, reflected by the reflecting surface 107b of the separating and synthesizing prism 107.

The first liquid crystal panel 108 is supplied with blue picture signals, from among the picture signals, separated into three prime colors, and displays a pattern corresponding to the green picture signals. The first liquid crystal panel is adapted for modulating and reflecting the illuminated light incident thereon. This first liquid crystal panel 108 is a liquid crystal panel, having liquid crystal molecules sealed therein, and is able to modulate light from one pixel to another.

The second liquid crystal panel 109 is supplied with green picture signals, from among the picture signals, separated into three prime colors, and displays a pattern corresponding to the green picture signals. The second liquid crystal panel is adapted for modulating and reflecting the illuminated light incident thereon. This second liquid crystal panel 109 is a liquid crystal panel, having liquid crystal molecules sealed therein, and is able to modulate light from one pixel to another.

The third liquid crystal panel 110 is supplied with red picture signals, from among the picture signals, separated into three prime colors, and displays a pattern corresponding to the green picture signals. The third liquid crystal panel is adapted for modulating and reflecting the illuminated light incident thereon. This third liquid crystal panel 110 is a liquid crystal panel, having liquid crystal molecules sealed therein, and is able to modulate light from one pixel to another.

The separating and synthesizing prism 107 separates the illuminated light, transmitted through the field lens 105, and the reflected light, modulated by the first to third liquid crystal panels 108 to 110, into light transmitted through the separating and synthesizing prism 107 to proceed straightforward, and light reflected by the reflecting surface 107a or 107b so as to be deflected by 90° in its proceeding direction.

The reflected light, modulated by the first to third liquid crystal panels 108 to 110, is transmitted through the PBS 106 to proceed straightforward.

The projector device 100 also includes a projector lens 111 along the proceeding direction of the reflected light, transmitted through the reflecting surface 106a of the PBS 106 and modulated by the first liquid crystal panel 108, the reflected light, transmitted through the reflecting surface 106a of the PBS 106 and modulated by the second liquid crystal panel 109 and the reflected light transmitted through the reflecting surface 106a of the PBS 106 and modulated by the third liquid crystal panel 110.

The projector lens 111 is a lens for enlarging and projecting the reflected light, transmitted through the reflecting surface 106a of the PBS 106 and modulated by the first liquid crystal panel 108, the reflected light, transmitted through the reflecting surface 106a of the PBS 106 and modulated by the second liquid crystal panel 109 and the reflected light transmitted through the reflecting surface 106a of the PBS 106 and modulated by the third liquid crystal panel 110, and is adapted for projecting an image on e.g., a screen, not shown.

The operation of the above-described projector device 100 is now explained along the optical path of the illuminated light radiated from the lamp 101.

The illuminated light radiated from the lamp 101 contains wavelength bands of three prime colors of light, namely red, green and blue, and is led as non-polarized light to the fly-eye integrator 102.

The illuminated light, led to the fly-eye integrator 102, is transmitted through the fly-eye integrator 102, as it is uniformed by the fly-eye integrator 102 in its illuminance distribution, to fall on the PS conversion synthesis element 103.

The illuminated light incident on the PS conversion synthesis element 103 has its S-polarized light directly transmitted therethrough, while having its P-polarized light converted into the S-polarized light. Thus, the light is incident as all S-polarized light to the main condenser 104.

The illuminated light incident on the main condenser 104 is collected by the main condenser 104 to fall on the field lens 105.

The illuminated light led to the field lens 105 is led to the PBS 106 so as to be collected by the field lens 105 on the first to third liquid crystal panels 108 to 110.

The illuminated light led to the PBS 106 is the S-polarized light, containing all of the red, green and blue wavelength bands, and is reflected by the reflecting surface 106a of the PBS 106 so as to be deflected 90° in its proceeding direction to reach the separating and synthesizing prism 107.

The illuminated light incident on the separating and synthesizing prism 107 is the S-polarized light containing all of the wavelength bands of red, green and blue. Of these, the blue wavelength band is reflected by the reflecting surface 107a and thereby deflected in the proceeding direction by 90°, to get to the first liquid crystal panel 108, while the green wavelength band is transmitted through the reflecting surfaces 107a, 107b to proceed straightforward to the second liquid crystal panel 109 and the red wavelength band is reflected by the reflecting surface 107b and thereby deflected in the proceeding direction by 90°, to get to the third liquid crystal panel. The illuminated light of the blue wavelength band is separated from the illuminated light of the red wavelength band so that the proceeding directions thereof differ 180° from each other.

Of the illuminated light separated by the separating and synthesizing prism 107, the illuminated light reflected by the reflecting surface 107a of the separating and synthesizing prism 107 and thence sent to the first liquid crystal panel 108 is the S-polarized light of the blue wavelength range, and is reflected, as it is modulated by the first liquid crystal panel 108, having displayed thereon a pattern corresponding to the blue picture signals, so that its proceeding direction is deflected by 180°. At this time, P-polarized light is generated and returned to the separating and synthesizing prism 107. Of the illuminated light separated by the separating and synthesizing prism 107, the illuminated light transmitted through the reflecting surfaces 107a, 107b of the separating and synthesizing prism 107 and thence sent to the second liquid crystal panel 109 is the S-polarized light of the green wavelength range, and is reflected, as it is modulated by the second liquid crystal panel 109, having displayed thereon a pattern corresponding to the green picture signals, so that its proceeding direction is deflected by 180°. At this time, P-polarized light is generated and returned to the separating and synthesizing prism 107.

Of the illuminated light separated by the separating and synthesizing prism 107, the illuminated light reflected by the reflecting surface 107b of the separating and synthesizing prism 107 and thence sent to the third liquid crystal panel 110 is the S-polarized light of the red wavelength range, and is reflected, as it is modulated by the third liquid crystal panel 110, having displayed thereon a pattern corresponding to the red picture signals, so that its proceeding direction is deflected by 180°. At this time, P-polarized light is generated and returned to the separating and synthesizing prism 107.

The reflected light from the first liquid crystal panel 108, returned to the separating and synthesizing prism 107, is the P-polarized light of the blue wavelength range and the S-polarized light as the OFF light, and is reflected on the reflecting surface 107a and thereby deflected 90° in its proceeding direction to be returned to the PBS 106.

The reflected light from the second liquid crystal panel 109, returned to the separating and synthesizing prism 107, is the P-polarized light of the green wavelength range and the S-polarized light as the OFF light, and is transmitted through the reflecting surfaces 107a, 107b and thereby deflected 90° in its proceeding direction to be returned to the PBS 106.

The reflected light from the third liquid crystal panel 110, returned to the separating and synthesizing prism 107, is the P-polarized light of the red wavelength range and the S-polarized light as the OFF light, and is reflected on the reflecting surface 107b and thereby deflected 90° in its proceeding direction to be returned to the PBS 106.

The reflected light from the first liquid crystal panel 108, returned to the PBS 106, is the P-polarized light of the blue wavelength range and the S-polarized light as the OFF light. The P-polarized light is transmitted through the reflecting surface 106a of the PBS 106 and thence supplied to the projector lens 111, while the S-polarized light as the OFF light is reflected on the reflecting surface 106a of the PBS 106 and thereby deflected 90° in its proceeding direction to be returned to the lamp 101.

The reflected light from the second liquid crystal panel 109, returned to the PBS 106, is the P-polarized light of the green wavelength range and the S-polarized light as the OFF light. The P-polarized light is transmitted through the reflecting surface 106a of the PBS 106 and thence supplied to the projector lens 111, while the S-polarized light as the OFF light is reflected on the reflecting surface 106a of the PBS 106 and thereby deflected 90° in its proceeding direction to be returned to the lamp 101.

The reflected light from the third liquid crystal panel 110, returned to the PBS 106, is the P-polarized light of the red wavelength range and the S-polarized light as the OFF light. The P-polarized light is transmitted through the reflecting surface 106a of the PBS 106 and thence supplied to the projector lens 111, while the S-polarized light as the OFF light is reflected on the reflecting surface 106a of the PBS 106 and thereby deflected 90° in its proceeding direction to be returned to the lamp 101.

Thus, the light of the respective wavelength bands, separated by the separating and synthesizing prism 107 into three optical paths, is incident on the liquid crystal panels, matched to the respective wavelength bands, as illuminated light, so as to be modulated and reflected by the respective liquid crystal panels. The reflected light, modulated by the respective liquid crystal panels, is synthesized by the separating and synthesizing prism 107 and led to the projector lens 111 so as to be thereby projected enlarged on e.g., a screen.

By employing the aforementioned diffraction prism 15 or 35 for the PBS 6, the favorable effects similar to those obtained with the projector device 10 or the projector device 30 may be obtained with the projector device 100.

Although a liquid crystal panel is used as the optical modulating device, this is not restrictive, such that any suitable device may be used that is capable of spatially modulating the state of polarization.

It is also possible to form a light separating layer capable of transmitting or reflecting the light depending on wavelength components on a plate-shaped transparent substrate, in place of the diffraction grid substrate 51 or 52 shown in FIGS. 7 and 8, and to form the prism substrates 54 comprised of plural flat plate shaped members 55 bonded together with a soft adhesive layer 56. Of course, the light separating layer may be directly formed on a preset flat plate shaped member without interposition of the plate-shaped transparent member.

What is claimed is:

1. A prism for transmitting or reflecting incident light depending on polarized light components thereof, comprising:
   a substantially grid-shaped diffraction grid, formed of metal;
   a pair of diffraction grid substrates sandwiching said diffraction grid in-between;
   a pair of adhesive layers, each adhesive layer of said pair of adhesive layers coupled to each substrate of said pair of diffraction grid substrates; and
   a pair of block members, each block member of said pair of block members coupled to said each adhesive layer, each block member configured with a plurality of substantially equally-spaced flat plate members alternately layered with adhesive layers for optically coupling said each block member with substantially reduced optical distortion than when configured with a single transparent component, said each block member having a surface to output the polarized light transmitted or reflected from said substantially grid shaped diffraction arid and passing through said plurality of flat plate members,
   wherein a medium having a refractive index approximately equivalent to that of said pair of block members is charged in a gap defined between said substantially grid-shaped diffraction grid and said pair of diffraction grid substrates.

2. The prism according to claim 1, wherein said each adhesive layer is of a soft type.

3. The prism according to claim 1, wherein said each block member is configured as a pillar having the bottom of a triangular cross-section with two sides of the triangle running substantially at right angles to each other, and wherein said each paired diffraction grid substrate is arranged at an inclined position along a lateral surface of said each block member having one side of said triangle other than said two sides as an edge.

4. The prism according to claim 1, wherein said plurality of flat plate members includes surfaces that are polished to a mirror finish.

5. The prism according to claim 1, wherein each plate member of said plurality of substantially equally-spaced flat plate members includes at least first and second layering surfaces, which are different in shaps.

6. The prism according to claim 5, wherein said two layering surfaces of said each plate member are substantially parallel to bonding surfaces of said pair of diffraction grid substrates coupled to said pair of adhesive layers.

7. A projector device comprising:
   a light source for radiating illuminated light;
   a light collecting lens for collecting the illuminated light radiated from said light source;
   a prism for transmitting or reflecting the light from said light collecting lens depending on polarized light components thereof;
   a light modulating element for modulating the illuminated light transmitted or reflected by said prism and for reflecting the modulated light; and
   a projector lens for enlarging and projecting the reflected light reflected or transmitted by said prism and modulated by said light modulating element,
   wherein said prism includes:
      a substantially grid-shaped diffraction grid, formed of metal,
      a pair of diffraction grid substrates sandwiching said diffraction grid in-between,
      a pair of adhesive layers, each adhesive layer of said pair of adhesive layers coupled to each substrate of said pair of diffraction grid substrates,
      a pair of block members, each block member of said pair of block members coupled to said each adhesive layer, each block member configured with a plurality of substantially equally-spaced flat plate members alternately layered with adhesive layers for optically coupling said each block member with substantially reduced optical distortion than when configured with a single transparent component, said each block member having a surface to output the illuminated light transmitted or reflected from said substantially grid shaped diffraction grid and passing through said plurality of plate members, and
      a medium having a refractive index approximately equivalent to that of said pair of block members, said medium being charged in a gap defined between said substantially grid-shaped diffraction grid and said pair of diffraction grid substrates.

8. The projection device according to claim 7, further comprising:
   polarization means disposed between said light source and the prism for outputting said illuminated light to said prism as light of preset directions of polarization.

9. The projection device according to claim 8, wherein said polarization means includes a polarized light converting synthesizing element for putting the polarized light components of the illuminated light into order or a pre-polarization element for transmitting light of a preset polarized light component of said illuminated light incident on said prism.

10. The projection device according to claim 7, wherein said each adhesive layer of said prism is of a soft type.

11. The projection device according to claim 7, wherein said plurality of substantially equally-spaced flat plate members in said prism is layered together using soft type adhesive layer.

12. A prism comprising:
   a light separating layer provided on a plate-shaped substrate for transmitting or reflecting light depending on polarized light components;
   a pair of adhesive layers counted to both surfaces of said plate-shaped substrate provided with said light separating layer; and a pair of block members sandwiching said pair of adhesive layers, each block member of said pair of block members configured with a plurality of substantially equally-spaced flat plate members alternately layered with adhesive layers for optically coupling said each block member with substantially reduced optical distortion than when configured with a single transparent component, said each block member having a surface to output the light transmitted or reflected from said light separating layer and passing through said plurality of flat plate members.

13. The prism according to claim 12, wherein the pair of adhesive layers of said prism is of a soft type.

14. The prism according to claim 12, wherein said each block member is configured as a pillar having the bottom of a triangular cross-section with two sides of the triangle running substantially at right angles to each other.

15. The prism according to claim 12, wherein each plate member of said plurality of substantially equally-spaced flat plate members includes at least first and second layering surfaces, which are different in area.

16. A projector device comprising:

a light source for radiating illuminated light;

a light collecting lens for collecting the illuminated light radiated from said light source;

a prism for transmitting or reflecting the light from said light collecting lens depending on polarized light components thereof;

a light modulating element for modulating the illuminated light transmitted or reflected by said prism and for reflecting the modulated light; and a projector lens for enlarging and projecting the reflected light reflected or transmitted by said prism and modulated by said light modulating element; wherein said prism comprises:

a light separating layer provided on a plate-shaped substrate for transmitting or reflecting light depending on polarized light components, a pair of adhesive layers coupled to both surfaces of said plate-shaped substrate provided with said light separating layer, and a pair of block members sandwiching said pair of adhesive layers, each block member of said pair of block members configured with a plurality of substantially equally-spaced flat plate members alternately layered with adhesive layers for optically coupling said each block member with substantially reduced optical distortion than when configured with a single transparent component, said each block member having a surface to output the light transmitted or reflected from said light separating layer and passing through said plurality of flat plate members.

17. The projector device according to claim 16, further comprising:

polarization means disposed between said light source and the prism for outputting said illuminated light as light of a preset direction of polarization to said prism.

18. The prism according to claim 1, wherein said plurality of flat plate members are arranged in a diagonal direction.

19. The prism according to claim 1, wherein said plurality of flat plate members are arranged in a vertical direction.

20. The prism according to claim 1, wherein said plurality of flat plate members are arranged in a horizontal direction.

21. The prism according to claim 5, wherein said plurality of substantially equally-spaced flat plate members includes at least first and second flat plate members such that the first layering surface of the first plate member is substantially same in shape as the first layering surface of the second plate member.

22. The prism according to claim 15, wherein said plurality of substantially equally-spaced flat plate members includes at least first and second flat plate members such that the first layering surface of the first plate member is substantially same in shape as the first layering surface of the second plate member.

* * * * *